(12) United States Patent
Budd et al.

(10) Patent No.: US 7,036,944 B2
(45) Date of Patent: May 2, 2006

(54) RETROCHROMIC ARTICLES

(75) Inventors: Kenton D. Budd, Woodbury, MN (US);
Matthew H. Frey, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 4 days.

(21) Appl. No.: 10/122,520

(22) Filed: Apr. 11, 2002

(65) Prior Publication Data

US 2003/0193718 A1    Oct. 16, 2003

(51) Int. Cl.
*G02B 5/128* (2006.01)

(52) U.S. Cl. ............................ 359/536; 359/542

(58) Field of Classification Search ............. 359/515, 359/534–545, 599, 581; 602/526, 575, 223
See application file for complete search history.

(56) References Cited

U.S. PATENT DOCUMENTS

| | | |
|---|---|---|
| 2,326,634 A | 8/1943 | Gebhard et al. |
| 2,407,680 A | 9/1946 | Palmquist et al. |
| 2,713,286 A | 7/1955 | Taylor |
| 2,963,378 A | 12/1960 | Palmquist et al. |
| 3,025,764 A | 3/1962 | McKenzie |
| 3,154,872 A | 11/1964 | Nordgren |
| 3,172,942 A | 3/1965 | Berg |
| 3,700,305 A | 10/1972 | Bingham |
| 3,700,478 A | 10/1972 | Bingham |
| 3,758,192 A | 9/1973 | Bingham |
| 3,767,291 A | 10/1973 | Johnson |
| 3,801,183 A | 4/1974 | Sevelin et al. |
| 3,832,038 A | 8/1974 | Johnson |
| 3,858,977 A | 1/1975 | Baird et al. |
| 4,022,318 A | 5/1977 | Goodman |
| 4,082,426 A | 4/1978 | Brown |
| 4,099,838 A | 7/1978 | Cook et al. |
| 4,102,562 A | 7/1978 | Harper et al. |
| 4,367,920 A | 1/1983 | Tung et al. |
| 4,564,556 A | 1/1986 | Lange |
| 4,630,891 A | 12/1986 | Li |
| 4,691,993 A | 9/1987 | Porter et al. |
| 4,735,869 A | 4/1988 | Morita |
| 4,758,469 A | 7/1988 | Lange |
| 4,849,265 A | 7/1989 | Ueda et al. |
| 4,957,335 A | 9/1990 | Kuney, Jr. |
| 4,988,541 A | 1/1991 | Hedblom |
| 4,988,555 A | 1/1991 | Hedblom |
| 5,169,707 A | 12/1992 | Faykish et al. |
| 5,227,221 A | 7/1993 | Hedblom |
| 5,229,882 A | 7/1993 | Rowland |
| 5,344,024 A | 9/1994 | Cohu |

(Continued)

FOREIGN PATENT DOCUMENTS

EP        0 291 205 A1    11/1988

(Continued)

OTHER PUBLICATIONS

Coderre et al., "Retroreflective Construction With Multifunctional Optical Coatings", Feb. 6, 1998, pp. 2-7.

(Continued)

*Primary Examiner*—Drew A. Dunn
*Assistant Examiner*—Joshua L Pritchett

(57) ABSTRACT

Retrochromic articles have a retrochromic pattern comprising first and second viewable retroreflective regions, wherein at least one viewable retroreflective region comprises a plurality of intrinsically retrochromic beads. Methods for making such articles are also provided. Articles according to the present invention have covert security features, and may be used, for example, to authenticate security articles.

103 Claims, 2 Drawing Sheets

U.S. PATENT DOCUMENTS

| | | |
|---|---|---|
| 5,344,705 A | 9/1994 | Olsen |
| 5,380,551 A | 1/1995 | Blonder et al. |
| 5,468,540 A | 11/1995 | Lu |
| 5,477,219 A | 12/1995 | Zarembo et al. |
| 5,516,227 A | 5/1996 | Kozak et al. |
| 5,612,119 A | 3/1997 | Olsen et al. |
| 5,620,775 A | 4/1997 | LaPerre |
| 5,624,731 A | 4/1997 | Desjardins |
| 5,673,148 A | 9/1997 | Morris et al. |
| 5,916,399 A | 6/1999 | Olsen |
| 5,962,121 A | 10/1999 | Mori |
| 5,988,822 A * | 11/1999 | Abe et al. ............... 359/541 |
| 6,000,804 A | 12/1999 | Kimura |
| 6,010,770 A | 1/2000 | Walters |
| 6,045,894 A | 4/2000 | Jonza et al. |
| 6,060,157 A | 5/2000 | LaPerre et al. |
| 6,153,128 A | 11/2000 | Lightle et al. |
| 6,157,486 A | 12/2000 | Benson, Jr. et al. |
| 6,245,700 B1 | 6/2001 | Budd et al. |
| 6,288,837 B1 * | 9/2001 | Hubbard ................ 359/359 |
| 6,500,526 B1 * | 12/2002 | Hannington ............. 428/195 |
| 6,558,009 B1 * | 5/2003 | Hannington et al. ....... 359/534 |
| 6,560,025 B1 * | 5/2003 | Tabata et al. ............ 359/624 |
| 6,571,955 B1 | 6/2003 | Rossman |
| 2002/0013207 A1 | 1/2002 | Frey et al. |

FOREIGN PATENT DOCUMENTS

| | | |
|---|---|---|
| EP | 0 947 266 A1 | 10/1999 |
| EP | 0 978 736 A1 | 2/2000 |
| GB | 1 415 792 | 5/1973 |
| JP | 02-099988 | 4/1990 |
| WO | WO 97/01776 | 1/1997 |
| WO | WO 98/01779 | 1/1998 |
| WO | WO 99/55537 A1 | 11/1999 |
| WO | WO 00/65381 | 11/2002 |

OTHER PUBLICATIONS

Morstein et al., "Plasma CVD of Ultrathin $TiO_2$ Films on Powders in a Circulating Fluidized Bed", Chemical Vapor Deposition, 2000, 6, No. 1.

Pozzo et al., "Supported titanium oxide as photocatalyst in water decontamination: State of the art", Catalysis Today 39 (1997) 219-231.

U.S. Appl. No. 10/122,527, filed Apr. 11, 2002, Method of Making Retrochromic Beads and Kit Thereof (Case No. 57438US002).

Filed Jul. 10, 2002, Disclosure of Information Under 37 C.F.R. § 1.56 By Kenton D. Budd.

* cited by examiner

RETROCHROMIC ARTICLES

TECHNICAL FIELD

The invention relates generally to retroreflective articles that cause a change in color of retroreflected light, and methods of making them.

BACKGROUND

"Retroreflectivity" means the ability, if engaged by a beam of light, to reflect that light substantially back in the direction of the light source. Films, for example, transparent adhesive-backed overlay films, having covert retroreflective patterns have been used to authenticate security articles (e.g., passports, identification badges). Typically, such overlay films have covert retroreflective patterns that are not readily legible under conditions of diffuse illumination, but become readily legible if viewed in retroreflective mode (e.g., with a flashlight or specialized device such as a retroviewer).

Depending on the application, the addition of covert color to retroreflective articles may provide additional security features (e.g., as in the case of authentication of passports or identification badges), or novel visual effects (e.g., as used in the design and production of graphic articles).

As used herein, the term "retrochromism" refers to the ability of an object, or region of an object, if viewed in retroreflective mode (i.e., with the illumination source substantially co-linear with the line of sight, typically forming an angle of reflection of about 10 degrees or less), to exhibit a reflected color different from the color exhibited if the object or region is viewed in other than retroreflective mode. Various constructions that exhibit retrochromism are known. For example, in one such construction high refractive index glass beads are partially embedded in a layer of or layers of material(s) (e.g., including a dielectric mirror). A change in color of retroreflected light results from the interaction of light, the bead, and the layer(s) into which it is partially embedded. Such articles may be prone to loss of, or irregularity in, their retrochromism due to coating thickness variations of the layer(s) and differences in the depth of penetration of the beads into the layer(s). Such articles may further be prone to damage caused by flexing the article during usage, or if used as heat-shrink tamper indicating films.

To overcome such drawbacks, it would be desirable to have retrochromic articles that are not subject to such variables. It would also be desirable that such articles have covert retrochromic patterns comprising multiple retroreflective colors.

SUMMARY OF THE PRESENT INVENTION

In one aspect, the present invention provides an article having a retrochromic pattern, the pattern comprising first and second viewable retroreflective regions having substantially different retroreflective colors if viewed using the same illumination source, wherein at least one of the viewable retroreflective regions comprises at least 10 intrinsically retrochromic beads and is retrochromic.

In another aspect, the present invention provides a method of making an article having a retrochromic pattern comprising:

providing a substrate;

affixing a first retroreflective material to the substrate to form a first viewable retroreflective region; and affixing a second retroreflective material to the substrate to form a second viewable retroreflective region;

wherein the first and second retroreflective materials form a retrochromic pattern, the pattern comprising first and second viewable retroreflective regions having substantially different retroreflective colors if viewed using the same illumination source, wherein at least one of the viewable retroreflective regions comprises at least 10 intrinsically retrochromic beads and is retrochromic.

In another aspect, the present invention provides an article having a retrochromic pattern, the pattern comprising first and second viewable retroreflective regions having substantially different retroreflective colors if viewed using the same illumination source, wherein at least one of the viewable retroreflective regions comprises intrinsically retrochromic beads which are non-randomly positioned with respect to adjacent beads.

Articles according to the present invention overcome the previously mentioned deficiencies by incorporating intrinsically retrochromic beads, wherein retrochromism is an inherent property of the beads themselves, rather than resulting from a particular construction. According to the present invention articles can be easily prepared with covert retrochromic patterns comprising multiple retroreflective colors.

The following definitions are used throughout the specification and claims:

"Intrinsically retrochromic bead" means a bead that exhibits retrochromism, in substantially all orientations, if immersed in its entirety in at least one isotropic medium.

"Light" refers to electromagnetic radiation having one or more wavelengths in the visible (i.e., from about 400 nm to about 700 nm), ultraviolet (i.e., from about 200 nm to about 400 nm), and/or infrared (i.e., from about 700 nm to about 100 micrometers) regions of the electromagnetic spectrum.

"Metal oxide" refers to a material made up primarily of one or more types of metal and/or metalloid cations and oxygen, and which may contain minor amounts of other elements and compounds.

"Refractive index" refers to the index of refraction at a wavelength of 589.3 nanometers (i.e., nm) corresponding to the sodium yellow d-line, and a temperature of 20° C., unless otherwise specified.

"Retrochromic" means that the object being referred to exhibits retrochromism.

"Retrochromic pattern" refers to a pattern comprising one or more retrochromic regions.

"Retroreflective color" refers to the appearance of retroreflected light. As used throughout the specification and claims, differences between retroreflective colors are to be determined using the same illumination source.

"Viewable" means visually observable at some distance from the object being viewed.

"Region" refers to a continuous portion of an object. Desirably, a region has a boundary or general extent that is substantially apparent or discernible to a viewer.

DETAILED DESCRIPTION

Figure 1:
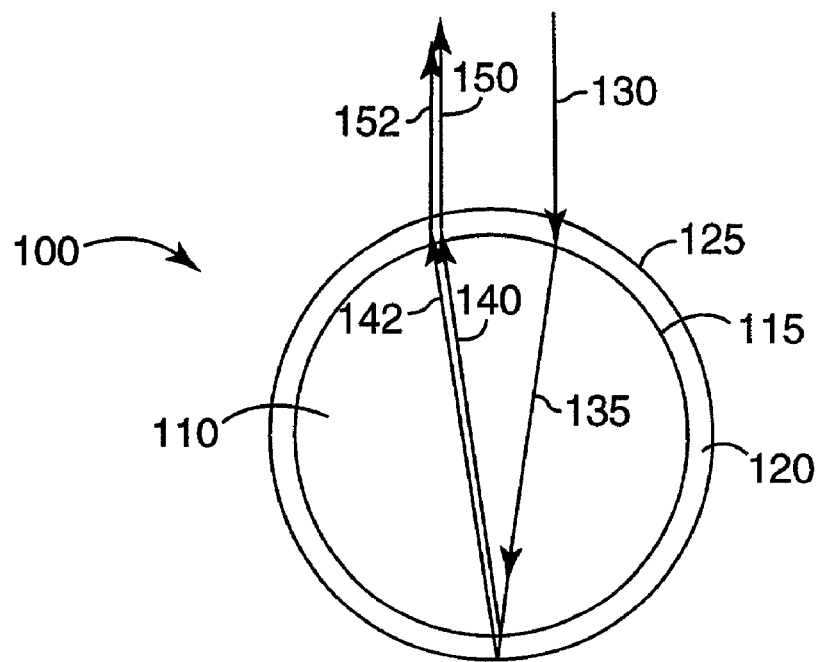
FIG. 1 is a cross-sectional view of a Type I intrinsically retrochromic bead depicting exemplary paths of retroreflected light.

Articles of the invention are conveniently made by forming a retrochromic pattern utilizing intrinsically retrochromic beads, optionally in combination with non-retrochromic retroflective materials (e.g., glass beads having a high index of refraction). The retrochromic pattern is desirably formed within and/or on the surface of a substrate.

Retrochromic patterns, useful in practice of the present invention, appear differently if viewed in retroreflective mode than if viewed under diffuse lighting conditions (e.g., fluorescent room lighting). As used herein, a "pattern" is defined by and composed of a plurality of regions.

In some embodiments, retrochromic patterns comprise retrochromic regions which are each discernible if viewed in both retroreflective and other modes.

In some embodiments, retrochromic patterns comprise one or more retrochromic regions that are only substantially discernible if viewed in retroreflective mode. Such retrochromic patterns are referred to throughout the specification and claims as being "covert".

Retrochromic patterns useful in practice of the present invention may be of any size and/or shape (e.g., substantially one, two, or three dimensional). Desirably, retrochromic patterns comprise one or more of a retrochromic well-defined geometric shape such as, for example, circle(s), line(s) (e.g., wavy, straight or curved), polygon(s) (e.g., triangle(s), square(s), rectangle(s)), polyhedron(s) (e.g., cube, tetrahedron, pyramid, sphere), or other indicia such as one or more of alphanumeric character(s) (e.g., letter(s), number(s), trademark(s), logo(s), official seal(s)), and/or graphics.

In some embodiments of the present invention, retrochromic patterns may be microscopic in size, for example, requiring magnification or other viewing aids to discern them, however larger retrochromic patterns are also useful. It is also within the scope of the present invention to provide microscopic retrochromic patterns within larger retrochromic patterns.

The retrochromic pattern is typically formed utilizing intrinsically retrochromic beads (e.g., of Type I or Type II) as described hereinbelow, and optionally retroreflective non-retrochromic beads as described in, for example, U.S. Pat. No. 2,326,634 (Gebhard et al.), and U.S. Pat. No. 5,620,775 (LaPerre), the disclosures of which are incorporated herein by reference.

Viewable retroreflective regions may be superimposed, overlapping, or distinct (i.e., non-intersecting). Viewable retroreflective regions may be adjacent or non-adjacent. In some embodiments of the present invention, viewable retroreflective regions are desirably substantially non-intersecting. Viewable retroreflective regions may be at the surface of and/or in the interior of the article.

Two or more retroreflective regions may, desirably, each comprise intrinsically retrochromic beads, having different retroreflective colors and/or types of intrinsically retrochromic beads, respectively.

In some embodiments of the present invention, one or more viewable retroreflective regions each comprise a number of intrinsically retrochromic beads. For example, a retroreflective region may comprise at least about 10 intrinsically retrochromic beads, desirably at least about 100 intrinsically retrochromic beads, and more desirably at least about 500 intrinsically retrochromic beads.

In some embodiments, a pattern may comprise a retrochromic micropattern in which intrinsically retrochromic beads which are non-randomly positioned with respect to adjacent beads.

In one exemplary embodiment, a retrochromic micropattern may be formed by positioning individual beads so as to form regular shapes and/or arrays (e.g., a pattern having alternating rows of intrinsically retrochromic beads, wherein the beads of each row respectively exhibit substantially the same retroreflective color as other beads in that row).

In another exemplary embodiment, a retrochromic micropattern may comprise a row of intrinsically retrochromic beads having a regular color sequence (e.g., red-green-red-green- . . . ). In this embodiment, an individual bead could constitute a region of the micropattern.

Micropatterns may be of any size, and may, for example, constitute or be contained within larger retrochromic patterns (e.g., retrochromic patterns in which individual beads constitute pixels of a larger, high resolution covert image).

In some embodiments of the present invention, at least one viewable region is contained in one or more interior cavities of a substrate. As used herein, the phrase "interior region" refers to a region that is entirely contained within the outer surface of the substrate. Viewable interior regions may be substantially filled (e.g., beads encased in a block of transparent polycarbonate). Alternatively, the viewable interior region, for example, contain one or more intrinsically retrochromic beads and an additional quantity of one or more other media (e.g., air, liquid, vacuum).

Figure 3:
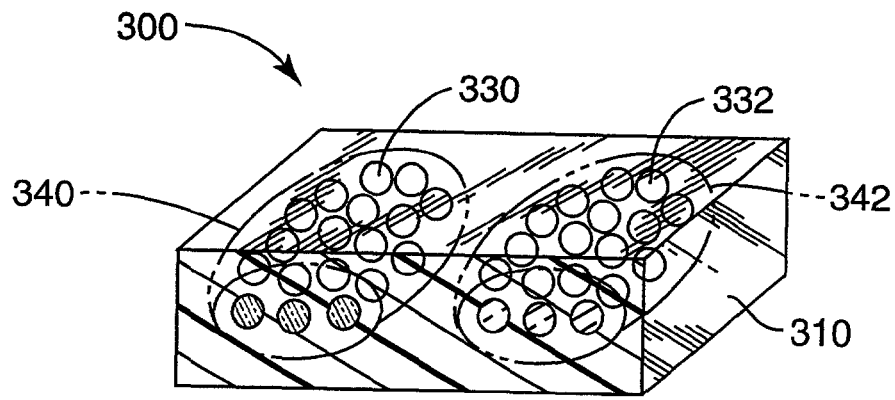
FIG. 3 is a cross-sectional isometric view of an exemplary embodiment of retrochromic article according to the present invention.

An exemplary article of this type is shown in FIG. 3. In this embodiment, article 300 comprises substrate 310 having two viewable interior regions 340 and 342. Interior region 340 contains intrinsically retrochromic beads 330 and exhibits a first retroreflective color. Interior region 342 contains intrinsically retrochromic beads 332 and exhibits a second retroreflective color.

In some embodiments of the invention, the substrate may comprise viewable bubbles or cells.

Figure 4:
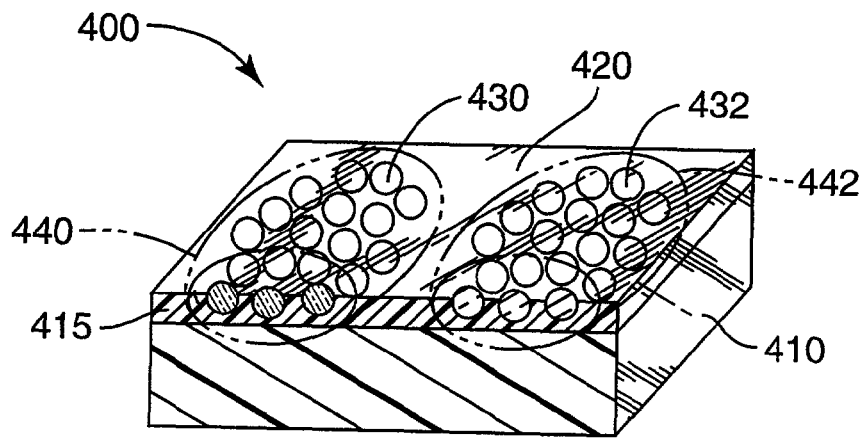
FIG. 4 is a cross-sectional isometric view of an exemplary embodiment of retrochromic article according to the present invention.

In some embodiments of the present invention, one or more viewable retroreflective regions comprise a retroreflective layer. The retroreflective layer may be affixed to a, typically major, surface of a substrate, either as, for example, a layer of beads (e.g., intrinsically retrochromic beads and/or retroreflective non-retrochromic beads) that have been partially embedded (e.g., by heat and/or pressure) into the surface of the substrate, or as, for example, a coating comprising retroreflective beads and a binder material. An exemplary such embodiment, is shown in FIG. 4. Article 400 comprises substrate 410, and retroreflective layer 415 comprising viewable regions 440 and 442. Retroreflective layer 415 comprises binder 420 and intrinsically retrochromic beads 430 and 432, wherein viewable regions 440 and 442 exhibit first and second retroreflective colors, respectively.

The present invention also provides articles comprising a substrate having a surface having at least one integral topographical feature (i.e., a surface that comprises at least one feature which is raised or depressed relative to the surface area adjacent to the feature, and wherein the feature is integral to the substrate) and having a retrochromic pattern. The retrochromic pattern has at least two viewable retroreflective regions, and at least one region comprises a plurality of intrinsically retrochromic beads.

Figure 5:
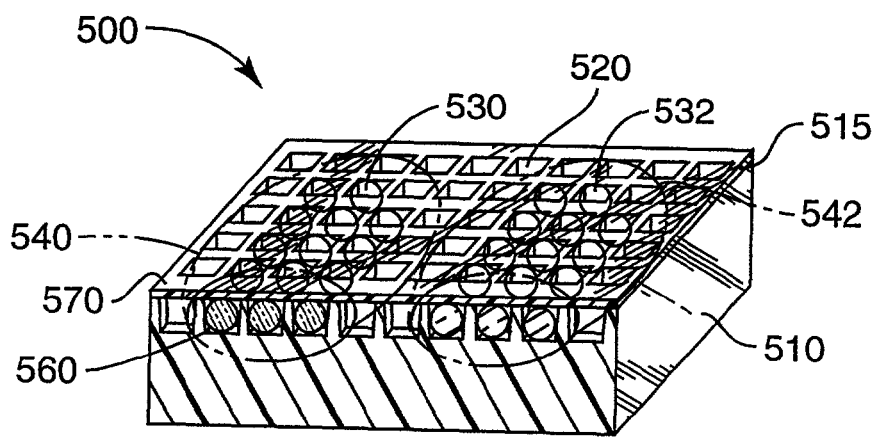
FIG. 5 is a cross-sectional isometric view of an exemplary embodiment of retrochromic article according to the present invention.

An exemplary article of this type is shown in FIG. 5. Article 500 comprises substrate 510 having a topographical surface 515 comprising two viewable regions 540 and 542, and comprising an array of wells 520. Some of wells 520 contain intrinsically retrochromic beads 530 and 532. Viewable regions 540 and 542 have first and second retroreflective colors, respectively, so as to form a retrochromic pattern. Wells 520 may optionally contain liquid 560. Optional cover layer 570 is affixed to the edges of the wells, optionally forming a hermetic seal.

Integral topographical features utilized in practice of the present invention may be of any size or shape. Typically such features are of a size so as to establish regions that can comprise intrinsically retrochromic beads. Topographical features typically have a height of at least about 50 micrometers. Topographical features typically have a height of less than about 5 centimeters. The integral topographical feature may be, for example, a pyramid, a post, a ridge, a channel, a groove, a well (e.g., a hemispherical depression or truncated square pyramidal depression), and combinations thereof. For surfaces comprising at least one integral topographical feature, a plurality of integral topographical features may desirably form a repeating pattern, e.g., array of wells, although random placement of integral topographical features may also be employed. For repeating patterns, the center-center distance of like integral topographical features is desirably in the range of from about 0.1 millimeters to about 1 cm, although other center-center distances may be used.

Integral topographical features may be made by any technique. For thermoplastic substrates, useful techniques include, for example, forming the substrate by injection molding, or embossing the substrate as described, for example, in PCT Publication No. WO 99/55537 A1 (Ylitalo et al.), the disclosure of which is incorporated herein by reference.

In some desired embodiments, wherein the substrate surface comprises a plurality, desirably an array, of integral topographical features, a transparent cover layer may be affixed to substantially all of the integral topographical features thereby defining a plurality of enclosed cavities, such that substantially all of the enclosed cavities contain at least one intrinsically retrochromic bead. The cover layer may be affixed using temporary or permanent means, including, for example, adhesive (e.g., pressure-sensitive adhesive, hot melt), and/or heat lamination. In some desired embodiments, the enclosed cavities further contain a liquid. Exemplary liquids include oils (e.g., mineral oil) and water. In some embodiments, an optional seal may be affixed around the perimeter of the cover layer where it contacts the substrate. The seal may, for example, comprise a thermoplastic material, or a thermosetting material.

In some desired embodiments of the invention, the retrochromic pattern comprises at least one identifying mark. Exemplary identifying marks include a trademark, a brand name, a manufacturer's name, a government seal (e.g., presidential seal, agency seal).

Articles according to the present invention may be affixed to any item, for example, a security article. Security articles may be, for example, items of legal, governmental, and/or financial importance. Exemplary security articles include a certificate of title (e.g., to a home or car), a stock certificate, a financial instrument (e.g., a loan contract), a ticket (e.g., an airline ticket or a lottery ticket), a check, a report, a financial card (e.g., credit card or a debit card), an identity card, a currency, a passport, or a license. Articles according to the present invention may be affixed to other items, and used as a tamper-indicating seal, for example, for reclosable containers (e.g., liquor bottles, medication bottles).

Retrochromic patterns may be formed in a variety of ways. In one exemplary method, a carrier sheet (e.g., a polyethylene film) having a monolayer of partially exposed retroreflective beads (e.g., glass beads or intrinsically retrochromic beads) is prepared by the method described, for example, in U.S. Pat. No. 4,367,920 (Tung et al.), the disclosure of which is incorporated herein by reference. An adhesive binder material (e.g., a glue, a pressure-sensitive adhesive, or a hot melt adhesive) is applied to the exposed retroreflective beads in an image-wise manner (e.g., by screen printing, ink jet printing, or thermal transfer printing) as described, for example, in U.S. Pat. No. 5,612,119 (Olsen et al.), or U.S. Pat. No. 5,916,399 (Olsen), the disclosures of which are incorporated herein by reference. The imaged adhesive binder is brought into contact with the substrate, whereby the binder becomes affixed to the substrate. The carrier sheet is then stripped off, thereby exposing the retroreflective beads, which remain affixed to the binder. This transfer printing process may be repeated, at will, with different retroreflective beads and can lead to retrochromic patterns having, for example, three, four, five, or more regions with distinctive appearances if viewed in retroreflective mode.

In another method, an adhesive binder, as described above, may be applied in an image-wise manner directly to a substrate (e.g., by heat lamination, screen printing, pressure lamination, ink jet printing, or spraying). Flood coating the adhesive image with retroreflective beads, desirably intrinsically retrochromic beads, results in the beads adhering to the adhesive. Subsequent application of another adhesive binder in an image-wise manner and flood coating with intrinsically retrochromic beads that are different from the retroreflective beads previously adhered to the substrate results in a pattern having two viewable retroreflective regions on the surface of a substrate. Repetition of this process can lead to retrochromic patterns having, for example, three, four, five, or more regions with distinctive appearances if viewed in retroreflective mode.

An optional protective layer (e.g., a transparent thermoplastic film) may be bonded (e.g., heat laminated or adhesively bonded) to exposed retroreflective beads, which may be intrinsically retrochromic or otherwise.

In another method, a dispersion of retroreflective beads in a liquid vehicle may be printed onto a topographical surface comprising an array of wells. The dispersion may further comprise a binder material. The liquid, retroreflective beads, and optional binder collect in wells where printed. The liquid may be allowed to evaporate or not, as desired. The printing process may be repeated as many times as desired using intrinsically retrochromic beads that are different from previously printed retroreflective beads. An optional cover layer may be laminated to the topographical surface thereby sealing the tops of the wells and creating an array of fully enclosed cavities containing retroreflective beads.

Useful substrates typically comprise one or more solid materials (e.g., metal, wood, plastic, glass, ceramic, paper, and mixtures thereof). The substrate may be at least partially transparent, translucent, and/or opaque. Desirably, the substrate is transparent throughout its entirety. The substrate may be homogenous or heterogeneous in composition. The substrate may be of any shape, but desirably is substantially two-dimensional, for example, having first and second opposed major surfaces. Desired substrates comprise thermoplastic film (e.g., polyurethane film), metal foil, and/or paper.

In some embodiments of the present invention, an optional adhesive layer is affixed (e.g., adhesively bonded) to the substrate. The adhesive layer may also, optionally, contact a release liner (e.g., a polyethylene or silicone coated paper or film). The adhesive layer typically comprises at least one of a hot melt adhesive, a thermoset adhesive, or a pressure-sensitive adhesive. Exemplary hot melt adhesives include thermoplastic hot melt adhesives (e.g., polyesters, polyurethanes, vinyl acetate copolymers, or polyolefins), and thermosettable hot melt adhesives (e.g., moisture activated adhesives, light activated adhesives, radiation activated adhesives, or combinations thereof). Exemplary thermoset adhesives include glues, urethanes, epoxies, and aminoplasts. Exemplary pressure-sensitive adhesives include acrylate copolymers (e.g., a copolymer of isooctyl acrylate and acrylic acid), desirably applied to the substrate as a latex as described in, for example, U.S. Pat. No. 4,630,891 (Li), the disclosure of which is incorporated herein by reference.

Retroreflective beads may be affixed to the substrate via a binder. Useful binders may comprise at least one of a thermoset material, a thermoplastic material, or a pressure-sensitive adhesive material (e.g., as previously described hereinabove). Exemplary binders include aliphatic or aromatic polyurethanes, polyesters, vinyl acetate polymers, polyvinyl chloride, acrylate polymers, and combinations thereof.

Intrinsically retrochromic beads having different retroreflective colors may be combined to form regions having custom retroreflective colors if viewed at relatively low resolution where individual beads cannot be resolved. However, if a region having such a custom retroreflective color is viewed at relatively higher magnification where individual beads can be resolved, it will appear as a mixture of beads having different retroreflective colors. Thus, an extra level of covert security may be imparted, as described above, if such regions are used for authentication of security documents.

Intrinsically retrochromic beads may, for example, be of at least two types, referred to herein as Type I and Type II intrinsically retrochromic beads.

Type I Intrinsically Retrochromic Beads

Referring now to FIG. 1, a Type I intrinsically retrochromic bead 100 comprises a transparent substantially spherical core 110 having thereon a concentric optical interference layer 120 having an exterior surface 125. Core 110 contacts optical interference layer 120 at interface 115.

Typically, concentric optical interference layer 120 forms a substantially uniform and complete layer over the entire surface of spherical core 110. Desirably, the concentric optical interference layer is uniform and complete, however minor imperfections in the layer (e.g., pinholes and/or minor thickness fluctuations) may be tolerated as long as they are not of sufficient size or amount to render the bead not intrinsically retrochromic.

Light is typically reflected at interfaces between materials having differing refractive indices (e.g., having a difference in refractive indices of at least 0.1). Thus, a sufficient difference in the refractive indices of the core 110 and substantially transparent optical interference layer 120 gives rise to a first reflection at interface 115. Similarly, a sufficient difference in the refractive indices of optical interference layer 120 and any background medium (e.g., vacuum, gas, liquid, solid) contacting optical interference layer 120 gives rise to a second reflection at exterior surface 125. Through proper selection of the thickness and refractive index of the optical interference layer, the two reflections may optically interfere with each other, resulting in a retroreflected color different from that which would otherwise be observed in the absence of such interference.

For example, retrochromic behavior can result from destructive interference of a portion of the optical spectrum determined by the thickness and refractive index of the optical interference layer. This effect is visible primarily if viewed in retroreflective mode, and is substantially not observable if viewed in other than retroreflective mode.

Referring again to FIG. 1, light 130 that is incident on Type I intrinsically retrochromic bead 100 is largely transmitted through optical interference layer 120, and enters core 110. A portion of the incident light 130 may be reflected at exterior surface 125 or interface 115. Retroreflection results from the portion of light 130 which enters core 110 and is at least partially focused by refraction onto the back of core 110. As refracted light 135 encounters interface 115 at the back of core 110, some of refracted light 135 is reflected back as reflected light 140 towards the front of the bead where it ultimately emerges from the bead as retroreflected light 150 in a direction that is substantially anti-parallel to incident light 130. Similarly, another portion of the focused light passes through optical interference layer 120 and is reflected back as reflected light 142 at exterior surface 125, which forms an interface with whatever medium in which the Type I intrinsically retrochromic bead 100 is disposed (e.g., gas, liquid, solid, or vacuum). Reflected light 142 ultimately emerges from the bead as retroreflected light 152 in a direction that is substantially anti-parallel to incident light 130. Remaining light that is not reflected passes entirely through the intrinsically retrochromic bead. Interference between reflected light 140 and reflected light 142, and in turn retroreflected light 150 and retroreflected light 152, gives rise to a change in color of the retroreflected light. For example, subtraction of wavelengths from the center of the spectrum of incident white light results in retroreflected light with a red-violet hue (i.e., retrochromism). Slightly thicker optical interference layers subtract longer wavelengths, resulting in, for example, green or blue-green hues.

Since reflection at an interface between two materials is dependent on the difference in refractive indices of the two materials, there is no inherent need to use cores and/or the optical interference layers comprising either high or low refractive index materials, as long as a sufficient difference in refractive indices is maintained. The difference in refractive indices of core 110 and optical interference layer 120, and the difference in refractive indices of optical interference layer 120 and the medium in which the retrochromic bead is intended to be used should be at least 0.1, desirably at least 0.2, more desirably at least 0.3, and most desirably at least 0.4. The refractive index of optical interference layer 120 may be either greater than or less than the refractive index of core 110. Generally, the choice of refractive index, and the corresponding choice of materials used, will be determined by the specific choice of the medium that contacts the exterior surface 125 in the region where reflection is intended to occur.

The refractive indices of core 110, concentric optical interference layer 120, and the medium in which the intrinsically retrochromic bead is intended to be used are desirably selected so as to control the focal power of the bead and the strength of reflections from interfaces 115 and 125. Color saturation of retroreflected light is typically maximized if the index of refraction differences at interfaces 115 and 125 are balanced (i.e., substantially equal). If index of refraction differences at the two interfaces are not balanced, retroreflected light typically appears pale or "washed out." At the same time, brightness of retroreflected color is typically maximized if balanced index of refraction differences are as large as possible.

In order to obtain a high level of retroreflectivity, it is typically desirable to select a core 110 having a relatively high index of refraction, desirably greater than 1.5, more desirably greater than 1.8. This allows the incident light to be at least partially focused onto the back of core 110 (i.e., the side opposite the source of incident light).

For example, a glass bead having a diameter in the range of 20 to 200 micrometers and refractive index of 1.9 and an air-exposed surface is typically a highly efficient retroreflective microlens for incident visible light. If a glass bead having a refractive index of 1.9 is coated with a thin layer of silica (i.e., an optical interference layer) with refractive index of about 1.4, the coated bead in air has a glass bead-silica layer interface with a refractive index difference of about 0.5 and a silica layer-air interface with an refractive index difference of about 0.4. Such coated beads can produce strong color effects if viewed using a retroviewer. However, if such coated beads are partially embedded in an organic material having an index of refraction much closer to that of the silica layer, the index difference at the silica layer-background medium interface becomes very low and color saturation and retroreflected intensity are dramatically reduced.

An optical interference layer comprising a high index of refraction such as titania can be used to provide significant index differences at both interfaces for this type of construction. Multilayer coatings can also be used to adjust the interference effect, or to simply fix the index differences of the interfaces (e.g., by using a much thicker outer coating).

The thickness of the concentric optical interference layer can, desirably, be selected to produce a pre-determined color effect.

Light that is reflected at an interface may be reflected with or without a phase inversion. Light that passes through a medium having a higher index of refraction and encounters an interface with a medium having a lower index of refraction will be reflected without phase inversion. By contrast, light that passes through a medium having a lower index of refraction and encounters an interface with a medium having a higher index of refraction will be reflected with phase inversion. Consequently, the appropriate choice of optical interference layer thickness will depend on the refractive index of core 110, the refractive index of the optical interference layer 120, and the refractive index of intended medium in which it is to be disposed. In any case, the thickness should be selected such that the reflected light from exterior surface 125 is π radians (i.e., 180°) out of phase with light of the same wavelength reflected from interface 115.

If the refractive index of the bead is greater than the refractive index of the optical interference layer, which in turn is greater than the refractive index of the medium, destructive interference typically occurs, for example, if the optical interference layer 120 has an optical thickness (i.e., thickness divided by refractive index) that is an odd multiple of one quarter of the wavelength (i.e., quarter wave) to be subtracted. By way of illustration, for such a relationship of refractive indices, an optical interference layer thickness of 137.5 nanometers (i.e., nm) may result in a red-violet hue if viewed in retroreflective mode using white light illumination. As the optical interference layer thickness increases, the destructive center moves toward longer wavelengths, and blue, blue-green, and yellow-green retroreflected colors are progressively observed.

If the refractive index of the bead is less than the refractive index of the optical interference layer, which in turn is greater than the refractive index of the medium, destructive interference typically occurs if the optical interference layer 120 has an optical thickness that is a multiple of one half of the wavelength to be subtracted.

Although the number of possible permutations of refractive indices, extra layers, and layer thicknesses is quite large, the specific choice of refractive indices and thicknesses will be readily apparent to one of ordinary skill in the art upon review of the forgoing discussion.

Type I intrinsically retrochromic beads may be conveniently, and economically, prepared using a fluidized bed of transparent beads and vapor deposition techniques. In general, the processes of depositing vapor phase materials onto a fluidized (i.e., agitated) bed of a plurality of beads, as used herein, can be collectively referred to as "vapor deposition processes" in which a concentric layer is deposited on the surface of respective transparent beads from a vapor form. In some embodiments, vapor phase precursor materials are mixed in proximity to the transparent beads and chemically react in situ to deposit a layer of material on the respective surfaces of the transparent beads. In other embodiments, material is presented in vapor form and deposits as a layer on the respective surfaces of the transparent beads with essentially no chemical reaction.

Depending upon the deposition process being used, precursor material(s) (in the case of a reaction-based deposition process) or layer material(s) (in the case of a non-reaction-based process), typically in vapor phase, is or are placed in a reactor with transparent beads. The present invention desirably utilizes a vapor phase hydrolysis reaction to deposit a concentric optical interference layer (e.g., a layer of metal oxide) onto the surface of a respective core. Such process is sometimes referred to as a chemical vapor deposition ("CVD") reaction.

Desirably, a low temperature, atmospheric pressure chemical vapor deposition ("APCVD") process is used. Such processes do not require vacuum systems and can provide high coating rates. Hydrolysis-based APCVD (i.e., APCVD wherein water reacts with a reactive precursor) is most desired because of the ability to obtain highly uniform layers at low temperatures, e.g., typically well below 300° C.

The following is an illustrative vapor phase hydrolysis-based reaction:

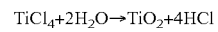

$TiCl_4 + 2H_2O \rightarrow TiO_2 + 4HCl$

In the illustrative reaction, water vapor and titanium tetrachloride, taken together, are considered metal oxide precursor materials.

Useful fluidized bed vapor deposition techniques are described, for example, in U.S. Pat. No. 5,673,148 (Morris et al.), the disclosure of which is incorporated herein by reference.

A well-fluidized bed can ensure that uniform layers are formed both for a given particle and for the entire population of particles. In order to form substantially continuous layers covering essentially the entire surfaces of the transparent beads, the transparent beads are suspended in a fluidized bed reactor. Fluidizing typically tends to effectively prevent agglomeration of the transparent beads, achieve uniform mixing of the transparent beads and reaction precursor materials, and provide more uniform reaction conditions, thereby resulting in highly uniform concentric optical interference layers. By agitating the transparent beads, essentially the entire surface of each assembly is exposed during the deposition, and the assembly and reaction precursors or layer material may be well intermixed, so that substantially uniform and complete coating of each bead is achieved.

If using transparent beads that tend to agglomerate, it is desirable to coat the transparent beads with fluidizing aids, e.g., small amounts of fumed silica, precipitated silica, methacrylato chromic chloride having the trade designation "VOLAN" (available from Zaclon, Inc., Cleveland, Ohio). Selection of such aids and of useful amounts thereof may be readily determined by those with ordinary skill in the art.

One technique for getting precursor materials into the vapor phase and adding them to the reactor is to bubble a stream of gas, desirably a non-reactive gas, referred to herein as a carrier gas, through a solution or neat liquid of the precursor material and then into the reactor. Exemplary carrier gases include argon, nitrogen, oxygen, and/or dry air.

Optimum flow rates of carrier gas(es) for a particular application typically depend, at least in part, upon the temperature within the reactor, the temperature of the precursor streams, the degree of assembly agitation within the reactor, and the particular precursors being used, but useful flow rates may be readily determined by routine optimization techniques. Desirably, the flow rate of carrier gas used to transport the precursor materials to the reactor is sufficient to both agitate the transparent beads and transport optimal quantities of precursor materials to the reactor.

Figure 2:
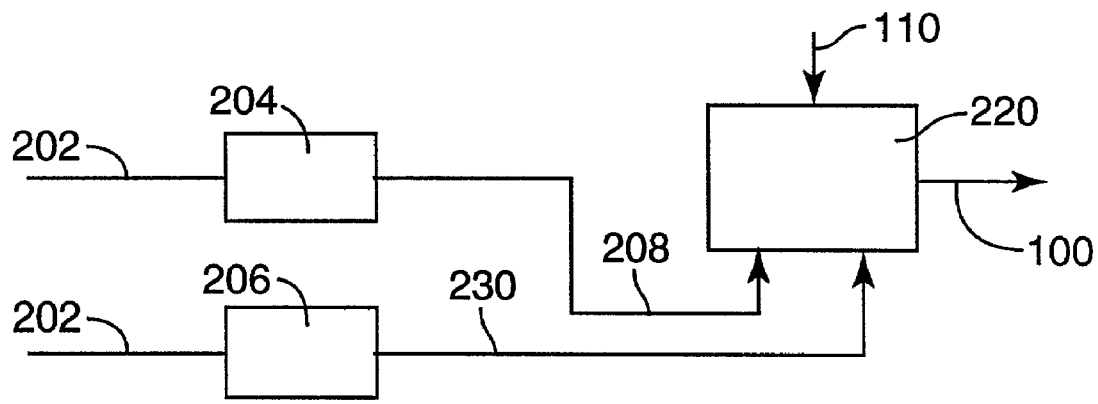
FIG. 2 is a flow diagram of an exemplary process, according to the present invention, for making Type I retrochromic beads.

Referring to FIG. 2, wherein an exemplary process for making intrinsically retrochromic beads is shown, carrier gas 202 is bubbled through water bubbler 204, to produce water vapor-containing precursor stream 208. Carrier gas 202 is also bubbled through titanium tetrachloride bubbler 206, to produce titanium tetrachloride-containing precursor stream 230. Precursor streams 208 and 230 are then transported into reactor 220. Cores 110 are introduced into reactor 220, and intrinsically retrochromic beads 100 are removed therefrom.

Typically, precursor flow rates are adjusted to provide an adequate deposition rate and to provide a metal oxide layer of desired quality and character. Desirably, flow rates are adjusted such that the ratios of precursor materials present in the reaction chamber promote metal oxide deposition at the surface of the transparent beads with minimal formation of discrete, i.e., free floating, metal oxide particles, elsewhere in the chamber. For example, if depositing layers of titania from titanium tetrachloride and water, a ratio of between about eight water molecules per each titanium tetrachloride molecule to one water molecule per two titanium tetrachloride molecule is generally suitable, with about two water molecules of water per titanium tetrachloride molecule being preferred. Under these conditions there is sufficient water to react with most of the titanium tetrachloride and most of the water is adsorbed onto the surface of the retroreflective bead. Much higher ratios tend to yield substantial quantities of unadsorbed water that might result in formation of oxide particulates rather than the desired oxide layers.

Desirably, precursor materials have sufficiently high vapor pressures that sufficient quantities of precursor material will be transported to the reactor for the hydrolysis reaction and layer deposition process to proceed at a conveniently fast rate. For instance, precursor materials having relatively higher vapor pressures typically provide faster deposition rates than precursor materials having relatively lower vapor pressures, thereby enabling the use of shorter deposition times. Precursor sources may be cooled to reduce vapor pressure or heated to increase vapor pressure of the material. The latter may necessitate heating of tubing or other means used to transport the precursor material to the reactor, to prevent condensation between the source and the reactor. In many instances, precursor materials will be in the form of neat liquids at room temperature. In some instances, precursor materials may be available as sublimable solids.

Precursor materials that are capable of forming dense metal oxide coatings via hydrolysis reactions at temperatures below about 300° C., and typically below about 200° C., are desired for coating glass beads. Desirably, titanium tetrachloride and/or silicon tetrachloride, and water are used as precursor materials. In addition to volatile metal chlorides, useful precursor materials include, for example, mixtures of water and at least one of: metal alkoxide(s) (e.g., titanium isopropoxide, silicon ethoxide, zirconium n-propoxide), metal alkyl(s) (e.g., trimethylaluminum, diethylzinc). It may be desirable to utilize several precursors simultaneously in a coating process.

Desirably, mutually reactive precursor materials, e.g., $TiCl_4$ and $H_2O$, are not mixed prior to being added to the reactor in order to prevent premature reaction within the transport system. Accordingly, multiple gas streams into the reaction chamber are typically provided.

Vapor deposition processes include hydrolysis based CVD and/or other processes. In such processes, the beads are typically maintained at a temperature suitable to promote effective deposition and formation of the concentric optical interference layer with desired properties on the beads. Increasing the temperature at which the vapor deposition process is conducted typically yields a resultant concentric layer that is denser and retains fewer fugitive unreacted precursors. Sputtering or plasma-assisted chemical vapor deposition processes, if utilized, often require minimal heating of the article being coated, but typically require vacuum systems, and can be difficult to use if coating particulate materials such as small glass beads.

Typically, a deposition process that operates at a temperature low enough not to undesirably degrade the transparent beads should be selected. Thus, deposition of the optical interference layer is desirably achieved using a hydrolysis-based APCVD process at temperatures below about 300° C., more desirably below about 200° C.

Titania and titania-silica layers deposited from tetrachlorides are particularly desired, and are easily deposited by APCVD at low temperatures, e.g., between about 120° C. and about 160° C.

Typically, any dimensionally stable substantially spherical transparent bead may be used as a core in practice of the present invention. Cores may be inorganic, polymeric or other provided that they are substantially transparent to at least one wavelength, desirably all wavelengths, of visible light. Typically, cores have a diameter of from about 20 to about 500 micrometers, desirably from about 50 to about 100 micrometers, although other diameters are possible.

Desirably, cores comprise a material, desirably an inorganic glass comprising silica, having a refractive index of from about 1.5 to about 2.5 or even higher, desirably from about 1.7 to about 1.9. Cores may also have a lower refractive index value depending on the particular intended application, and the composition of the concentric optical interference layer. For example, a silica glass bead with refractive index as low as about 1.50 may be desirably used as a core because of the low cost and high availability of soda-lime-silica (i.e., window glass). Optionally, cores may further comprise a colorant. Desirably, cores comprise glass.

Exemplary materials that may be utilized as a core include glasses (e.g., mixtures of metal oxides such as $SiO_2$, $B_2O_3$, $TiO_2$, $ZrO_2$, $Al_2O_3$, BaO, SrO, CaO, MgO, $K_2O$, $Na_2O$); and solid, transparent, non-vitreous, ceramic particles as described in, for example, U.S. Pat. No. 4,564,556 (Lange) and U.S. Pat. No. 4,758,469 (Lange), the disclosures of which are incorporated herein by reference.

Exemplary useful colorants include transition metals, dyes, and/or pigments, and are typically selected according to compatibility with the chemical composition of the core, and the processing conditions utilized.

The concentric optical interference layer employed in practice according to the present invention may be of any transparent material having a different refractive index than the core supporting the layer. Desirably, the concentric optical interference layer should be sufficiently smooth so as to be optically clear. Desirably, the concentric optical interference layer is tough, and not easily chipped or flaked.

Desirably, the concentric optical interference layer comprises a metal oxide. Exemplary metal oxides useful for the concentric optical interference layer include titania, alumina, silica, tin oxide, zirconia, antimony oxide, and mixed oxides thereof. Desirably, the optical interference layer comprises one of the following: titanium dioxide, silicon dioxide, aluminum oxide, or a combination thereof. Titania and titania/silica layers are most desired, as they are readily deposited and form durable layers.

Advantageously, portions of beads having various optical interference layer thicknesses and retroreflective colors can be removed from a reactor sequentially. One, two, three, or more pluralities of coated beads, each plurality having a different retroreflective color and collectively comprising a retrochromic color palette, may thus be easily obtained by charging a reactor with a large quantity of beads and sequentially removing portions of beads during a continuing coating run.

In one desirable embodiment, the progress of layer deposition may be monitored by viewing the beads in retroreflective mode, for example, by using a retroviewer (e.g., as described in U.S. Pat. No. 3,767,291 (Johnson) and U.S. Pat. No. 3,832,038 (Johnson), the disclosures of which are incorporated herein by reference) either in situ using a glass-walled reactor or by removal from the reactor. Retroviewers useful for viewing intrinsically retrochromic beads and articles containing them are also readily commercially available, for example, under the trade designation "3M VIEWER" from 3M Company, St. Paul, Minn.

Type II Intrinsically Retrochromic Beads Intrinsically retrochromic beads of Type II comprise partially transparent beads having microcrystalline regions therein. The microcrystalline regions are of a size typically less than the wavelength range of visible light. The microcrystalline regions scatter light of different wavelengths in the visible spectrum to different degrees. The microcrystalline regions scatter light on the short end of the visible wavelength spectrum more effectively than they scatter light on the long end of the visible wavelength spectrum. If the shorter wavelength components of the incident spectrum are preferentially scattered, the longer wavelength components are transmitted within the bead and, ultimately, retroreflected. Typically, the microcrystalline regions have a size in the range of from about 10 to about 500 nm. Desirably, the microcrystalline regions have a size of from about 50 to 250 nm, with substantially no microcrystalline regions being larger than 250 nm.

The retroreflected spectrum is modified, as compared with the incident spectrum. Modification of the spectrum refers to a change imparted to the relative intensities of the different incident wavelengths. Typically, for incident light that is white, colorless Type II retrochromic beads retroreflect light that is essentially yellow, orange, or red. Light-scattering inside the bead causes a modification of the retroreflected spectrum as compared with the incident spectrum. For crystallites grown to the size range of 50 to 250 nm, yellow, orange, or red light is transmitted within the bead and eventually retroreflected, while light of wavelengths near the violet end of the visible spectrum is preferentially scattered from the retroreflective light path. Preferential scattering of wavelengths near the violet end of the visible spectrum causes their subtraction from the incident spectrum, and thus they are not retroreflected.

In one exemplary method, Type II intrinsically retrochromic beads can be made as follows. First, an aqueous slurry is prepared from particulate components comprising at least two metal oxides. Optionally, an inorganic oxide dopant that imparts color to the finished bead by light absorption (e.g., a colorant) may also be present in the slurry. Desirably, particulate components of the slurry should be chosen such that upon melting and rapid quenching an amorphous transparent bead is formed. The transparent bead may contain small crystals (e.g., less than 10 nm), but the composition should be selected such that it crystallizes slowly enough that it can be quenched to form a glassy material.

Metal oxides useful for forming Type II intrinsically retrochromic beads are well known in the art. Exemplary metal oxides include $SiO_2$, $Al_2O_3$, $B_2O_3$, $Na_2O$, $K_2O$, CaO, MgO, BaO, SrO, $TiO_2$, $ZrO_2$. Certain metal oxides are known as strong glass-formers (e.g., $SiO_2$, $GeO_2$, $As_2O_5$, $P_2O_5$, $B_2O_3$). A strong glass-former is a metal oxide that can be relatively easily quenched into a solid amorphous state from the melt. Desirably, particulate components of the slurry comprise a strong glass-former. Metal oxides that do not readily form glasses by themselves may be incorporated into Type II intrinsically retrochromic beads, if used in combination with certain species (known as intermediates) and strong glass-formers. Exemplary intermediates include $Al_2O_3$ and PbO. $Al_2O_3$ may be incorporated into Type II intrinsically retrochromic beads if, for example, it is added to a strong glass-former (e.g., $SiO_2$) in combination with a modifier metal oxides. Such modifiers include, for example, alkali metal oxides and alkaline earth oxides (e.g., $Na_2O$, $K_2O$, MgO, CaO, SrO, BaO).

Certain metal oxides, (e.g., $TiO_2$, $ZrO_2$) may serve to nucleate crystallization if included in glass compositions. Such metal oxides are useful, for example, as nucleating agents for subsequent crystallization of the glass with heat-treatment.

Advantageously, flame-forming processes used to form Type II intrinsically retrochromic beads allow the use of a wider range of glass compositions than could be formed by traditional processes for the fabrication of glass articles. For example, compositions high in $TiO_2$ and $ZrO_2$ (e.g., greater than about 50 weight percent) would typically be considered inappropriate, as oxide melts which are very high in $TiO_2$ and/or $ZrO_2$ tend to form crystals during cooling. However, in the preparation of Type II intrinsically retrochromic beads, it is desirable to include at least one nucleating agent in the aqueous slurry such as, for example, titanium oxide or zirconium oxide.

As an additional feature, the rapid quench rates that are typical of the flame-forming process for manufacturing glass beads enable the preparation of a wider range of compositions as glasses than could be formed using slower cooling rate processes. In particular, eutectic compositions of traditionally non-glass-forming oxides can be prepared as glass beads. Thus, it is desirable that particulate metal oxide components in the slurry be present in approximately eutectic proportions.

The fact that compositions generally not expected to form glasses can be formed as glass beads opens up the range of compositions that are potentially useful for the formation of Type II microcrystalline retrochromic beads. Accordingly, the range of useful compositions is not limited to the compositions generally regarded as convenient for forming glasses or even glass-ceramics.

Desirably, microcrystalline retrochromic beads include a glass-forming metal oxide. For example, $SiO_2$ can aid in initial glass-forming, if included in the bead in an amount, for example, in the range of from about 2 to about 40 percent by weight based on the total weight of the bead. To generate a high density of microcrystals during heat-treatment, nucleating agents (e.g., $TiO_2$ and/or $ZrO_2$) are useful at levels ranging from greater than about 5 but less than 80 percent by weight based on the total weight of the bead. $TiO_2$ and $ZrO_2$ are also useful for achieving a high index of refraction (1.8–2.3). A high index of refraction is useful for strong retroreflection.

Additional constituents that may be present in microcrystalline intrinsically retrochromic beads include, for example, $B_2O_3$, $Al_2O_3$, MgO, CaO, BaO, $Na_2O$, and $K_2O$. The alkali metal oxides and alkaline earth oxides are especially useful for reducing the melting temperature of the composition, and can be included at a combined alkali metal oxide and alkaline earth oxide content of up to about 25 percent by weight of the total combined weight of the microcrystalline intrinsically retrochromic bead.

Desirably, if high levels (i.e., >60 percent by weight based on the total weight of the bead) of $TiO_2$ are included in the Type II intrinsically retrochromic bead composition, alkaline earth oxides are included at levels of greater than about 10 percent by weight based on the total weight of the bead, and aid in quenching transparent beads during the flame-forming process.

The slurry is then typically milled and dried to form a powder cake, then ground into particles. Particles are fed into the flame of a hydrogen/oxygen torch where they melt and form intermediate beads as described in, for example, U.S. Pat. No. 6,245,700 (Budd et al.), the disclosure of which is incorporated herein by reference. Intermediate beads are rapidly cooled (i.e., quenched), for example in a water tank to form vitreous beads. Cooled vitreous beads may, optionally, be passed a second time through the hydrogen torch to improve their transparency.

Next, cooled vitreous beads are placed into a crucible (e.g., an alumina crucible), and heated in a furnace by slowly ramping the temperature (e.g., at a rate of 10° C./minute) up to a temperature sufficient to devitrify them. The elevated temperature should be high enough to cause devitrification of the vitreous beads, but not so high that the beads fuse together. Desirably the elevated temperature is in the range of from about 400° C. to about 1200° C., more desirably from about 700° C. to about 1100° C. Elevated temperature is maintained for a sufficient time to substantially devitrify the beads, desirably a period ranging from about 15 to about 120 minutes. Subsequently, the temperature is reduced back to room temperature.

Desirably, the amount of colorant is in the range of from about 0.01 to about 5 weight percent, and more desirably in the range of from about 0.5 to about 3 weight percent, based on the total weight of the metal oxide components.

Appropriate processing conditions for generating Type II intrinsically retrochromic beads from transparent beads having a given chemical composition can be readily determined as follows.

In a first procedure, separate portions of beads are heat-treated, for example, by placing them into a furnace with a ramp rate of 10° C./min up to a number of equally spaced temperatures ranging from room temperature to the melting point of the composition. Such spacing between heat-treatment temperatures may be, for example, 50° C. or 100° C. Once each portion of beads reaches its desired temperature (i.e., soak temperature), it is maintained at that temperature for a period of time that is identical for all portions, for example, one hour. The portions are removed from the furnace and cooled to room temperature. With increasing soak temperature, for compositions that crystallize before melting, there is typically a progression from transparency to opacity for the heat-treated beads.

If none of the processed portions of the first procedure display the desired retrochromic effect, the procedure is repeated with soak temperatures ranging from the highest temperature at which transparent beads were observed to the lowest temperature at which opaque beads were observed. In this second procedure, soak temperatures spaced by, for example, 5° C. or 10° C., produce a series of heat-treated bead samples that more closely resolve the transition between a state of high transparency and a state of opacity.

If none of the processed portions of the second procedure display the desired retrochromic effect, a third procedure carried out with soak temperatures ranging from the highest temperature at which transparent beads were observed to the lowest temperature at which opaque beads were observed in the second procedure. In this third procedure, soak temperatures are spaced by, for example, 1° C. or 2° C.

Once appropriate conditions are found, the length of the soak time may be further adjusted in order to finely control the size of the microcrystalline regions.

Regardless of whether intrinsically retrochromic beads are of Type I or Type II, the magnitude of the retrochromic effect typically depends on the spectral breadth of source used to illuminate the retrochromic bead. Desirably, the source has a broad spectrum (e.g., white light), although narrower spectral ranges may also be used.

Whichever type(s) of intrinsically retrochromic bead(s) is/are used in practice of the present invention, the magnitude of retroreflection may be increased by coating onto the intrinsically retrochromic bead an integral hemispherical reflector as described in, for example, U.S. Pat. No. 2,963,378 (Palmquist et al.), the disclosure of which is incorporated herein by reference.

The following examples illustrate specific embodiments of the present invention. These examples are not intended to limit the invention that is defined in the attached claims.

EXAMPLES

In the examples that follow observed retroreflective color was determined by looking through a retroreflective viewer having the trade designation "3M VIEWER".

In the Examples and Tables that follow:

"mL" means milliliter;

"rt" means room temperature (i.e., approximately 20° C.);

"min" means minute.

General Procedure for the Preparation of Type I Beads

The preparation of the silica-coated glass beads of Preparative Examples 1–182 were carried out using an apparatus similar to that shown in FIG. 2. Eighty grams (g) of glass beads with an index of refraction of 1.9 and with an average diameter of about 65 microns (available under the trade designation "FLEX-O-LITE 831 SIGN BEADS" from Flex-O-Lite, Inc., Chesterfield, Mo.,) were charged into a glass frit funnel type fluidized bed CVD reactor with a 30 millimeters (i.e., mm) inner diameter reactor (as described, for example, in Example 1 of U.S. Pat. No. 5,673,148 (Morris et al.), the disclosure of which ti is incorporated herein by reference). For examples in which the reaction temperature was 50° C. or more, the reactor was wrapped with electric heating tape and monitored by the use of a thermocouple in the fluidized bed. For examples in which the reaction temperature was room temperature (i.e., approximately 20° C.), no heating tape was used. The bed of beads was fluidized with a stream of nitrogen gas introduced into the reactor through the glass frit (i.e., from the bottom of the bed of beads). Water vapor was simultaneously introduced into the reactor, through the glass frit, in a stream of nitrogen carrier gas by bubbling the carrier gas through water in a chamber separate from the reactor.

The metal oxide precursor compounds, either $SiCl_4$ (Preparative Examples 1–174), or a mixture of $SiCl_4$ and tetraethyl orthosilicate (TEOS, Preparative Examples 175–182), were introduced into the reactor, through a glass tube extending downward into the fluidized bed of beads, in a stream of nitrogen carrier gas by bubbling the carrier gas through the liquid precursor compound in a chamber separate from the reactor. For Preparative Examples 175–182, two separate chambers, one for each of the liquid precursor compounds, were used. Deposition of concentric coatings on the glass beads in Preparative Examples 1–182 commenced when the flow of reactant-laden nitrogen carrier gas through the reactor began.

Samples of concentrically coated glass beads were periodically removed from the reactor and were evaluated by viewing the samples in retroreflective mode. Thickness of the concentric coating was also determined by examining fractured concentrically coated glass beads with a scanning electron microscope.

Experimental details such as the flow rates of the reactant-laden carrier gases, the resultant thickness of the concentric coatings on the glass beads and the retroreflective color of the coated beads are reported in Tables 1 and 2 (below).

The preparation of the titania-coated glass beads of Preparative Examples 183–191 was carried out by the procedure used for Preparative Examples 1–182, except that a reactor having an 80 mm inner diameter was used and the titania precursor compound was $TiCl_4$. Glass beads (1800 g) with an index of refraction of 1.9 and an average diameter of about 65 micrometers (available under the trade designation "FLEX-O-LITE 831 SIGN BEADS" from Flex-O-Lite, Inc., Chesterfield, Mo.) were charged into the reactor. The reactor was wrapped with electric heating tape, which was used to maintain the temperature of the fluidized bed at approximately 175° C. as measured by a thermocouple in the fluidized bed. The flow rate of the nitrogen carrier gas through each of the separate reactant chambers was 7 liters per minute.

Samples of concentrically coated glass beads were periodically removed from the reactor and evaluated by viewing the samples in retroreflective geometry with a retroviewer as above. Thickness of the deposited concentric coating (i.e., optical interference layer) was also determined by examining fractured concentrically coated glass beads with a scanning electron microscope. Deposition times and the resultant retroreflective colors of the titania-coated glass beads, visually observed using a 3M VIEWER, are reported in Table 3 (below).

TABLE 1

| Preparative Example No. | Reaction Temperature (° C.) | SiCl₄ Flow Rate (mL/min) | H₂O Flow Rate (mL/min) | N₂ Flow Rate (mL/min) | Reaction Time (min) | Coating Thickness (nm) | Observed Retroreflective Color |
|---|---|---|---|---|---|---|---|
| 1 | rt | 25 | 800 | 800 | 10 | 31.3 | light gray |
| 2 | rt | 25 | 800 | 800 | 20 | 62.6 | lt tan |
| 3 | rt | 25 | 800 | 800 | 30 | 93.9 | blue |
| 4 | rt | 25 | 800 | 800 | 40 | 125.2 | faint green-gray tint |
| 5 | 50 | 42 | 475 | 150 | 4 | 7.4 | white |
| 6 | 50 | 42 | 475 | 150 | 5 | 9.2 | white |
| 7 | 50 | 42 | 475 | 150 | 6 | 11.0 | white |
| 8 | 50 | 42 | 475 | 150 | 7 | 12.9 | very faint gray tint |
| 9 | 50 | 42 | 475 | 150 | 8 | 14.7 | very faint gray tint |
| 10 | 50 | 42 | 475 | 150 | 9 | 16.6 | very faint gray tint |
| 11 | 50 | 42 | 475 | 150 | 10 | 18.4 | very faint gray tint |
| 12 | 50 | 42 | 475 | 150 | 11 | 20.2 | very faint gray tint |
| 13 | 50 | 42 | 475 | 150 | 12 | 22.1 | very faint gray tint |
| 14 | 50 | 42 | 475 | 150 | 13 | 23.9 | very faint gray tint |
| 15 | 50 | 42 | 475 | 150 | 14 | 25.8 | very faint gray tint |
| 16 | 50 | 42 | 475 | 150 | 15 | 27.6 | very faint gray tint |
| 17 | 50 | 42 | 475 | 150 | 16 | 29.4 | light gray |
| 18 | 50 | 42 | 475 | 150 | 17 | 31.3 | light gray |

TABLE 1-continued

| Preparative Example No. | Reaction Temperature (° C.) | SiCl₄ Flow Rate (mL/min) | H₂O Flow Rate (mL/min) | N₂ Flow Rate (mL/min) | Reaction Time (min) | Coating Thickness (nm) | Observed Retroreflective Color |
|---|---|---|---|---|---|---|---|
| 19 | 50 | 42 | 475 | 150 | 18 | 33.1 | light gray |
| 20 | 50 | 42 | 475 | 150 | 19 | 35.0 | light gray |
| 21 | 50 | 42 | 475 | 150 | 20 | 36.8 | light gray |
| 22 | 50 | 42 | 475 | 150 | 21 | 38.6 | light gray |
| 23 | 50 | 42 | 475 | 150 | 22 | 40.5 | light gray |
| 24 | 50 | 42 | 475 | 150 | 23 | 42.3 | light gray |
| 25 | 50 | 42 | 475 | 150 | 24 | 44.2 | light gray |
| 26 | 50 | 42 | 475 | 150 | 25 | 46.0 | light gray |
| 27 | 50 | 42 | 475 | 150 | 26 | 47.8 | very faint tan tint |
| 28 | 50 | 42 | 475 | 150 | 27 | 49.7 | very faint tan tint |
| 29 | 50 | 42 | 475 | 150 | 28 | 51.5 | very faint tan tint |
| 30 | 50 | 42 | 475 | 150 | 29 | 53.4 | faint tan tint |
| 31 | 50 | 42 | 475 | 150 | 30 | 55.2 | faint tan tint |
| 32 | 50 | 42 | 475 | 150 | 31 | 57.0 | light tan |
| 33 | 50 | 42 | 475 | 150 | 32 | 58.9 | light tan |
| 34 | 50 | 42 | 475 | 150 | 33 | 60.7 | light tan |
| 35 | 50 | 42 | 475 | 150 | 34 | 62.6 | light tan |
| 36 | 50 | 42 | 475 | 150 | 35 | 64.4 | light tan |
| 37 | 50 | 42 | 475 | 150 | 36 | 66.2 | light tan-faint red tint |
| 38 | 50 | 42 | 475 | 150 | 37 | 68.1 | faint red tint |
| 39 | 50 | 42 | 475 | 150 | 38 | 69.9 | faint red tint |
| 40 | 50 | 42 | 475 | 150 | 39 | 71.8 | light red |
| 41 | 50 | 42 | 475 | 150 | 40 | 73.6 | red-violet |
| 42 | 50 | 42 | 475 | 150 | 41 | 75.4 | violet-red |
| 43 | 50 | 42 | 475 | 150 | 42 | 77.3 | light violet-red |
| 44 | 50 | 42 | 475 | 150 | 43 | 79.1 | light violet |
| 45 | 50 | 42 | 475 | 150 | 44 | 81.0 | violet |
| 46 | 50 | 42 | 475 | 150 | 45 | 82.8 | violet |
| 47 | 50 | 42 | 475 | 150 | 46 | 84.6 | violet-blue |
| 48 | 50 | 42 | 475 | 150 | 47 | 86.5 | blue-violet |
| 49 | 50 | 42 | 475 | 150 | 48 | 88.3 | light blue-violet |
| 50 | 50 | 42 | 475 | 150 | 49 | 90.2 | light blue |
| 51 | 50 | 42 | 475 | 150 | 50 | 92.0 | blue |
| 52 | 50 | 42 | 475 | 150 | 51 | 93.8 | blue-green |
| 53 | 50 | 42 | 475 | 150 | 52 | 95.7 | light blue-green |
| 54 | 50 | 42 | 475 | 150 | 53 | 97.5 | light blue-green |
| 55 | 50 | 42 | 475 | 150 | 54 | 99.4 | light green-blue |
| 56 | 50 | 42 | 475 | 150 | 55 | 101.2 | light green-blue |
| 57 | 50 | 42 | 475 | 150 | 56 | 103.0 | light green-blue |
| 58 | 50 | 42 | 475 | 150 | 57 | 104.9 | light green-gray |
| 59 | 50 | 42 | 475 | 150 | 58 | 106.7 | light green-gray |
| 60 | 50 | 42 | 475 | 150 | 59 | 108.6 | light green-gray |
| 61 | 50 | 42 | 475 | 150 | 60 | 110.4 | faint green-gray tint |
| 62 | 50 | 42 | 475 | 150 | 61 | 112.2 | faint green-gray tint |
| 63 | 50 | 42 | 475 | 150 | 62 | 114.1 | faint green-gray tint |
| 64 | 50 | 42 | 475 | 150 | 63 | 115.9 | faint green-gray tint |
| 65 | 50 | 42 | 475 | 150 | 64 | 117.8 | faint green-gray tint |
| 66 | 50 | 42 | 475 | 150 | 65 | 119.6 | faint green-gray tint |
| 67 | 50 | 42 | 475 | 150 | 66 | 121.4 | faint green-gray tint |
| 68 | 50 | 42 | 475 | 150 | 67 | 123.3 | faint green-gray tint |
| 69 | 50 | 42 | 475 | 150 | 68 | 125.1 | faint green-gray tint |
| 70 | 50 | 42 | 475 | 150 | 69 | 127.0 | very faint gray tint |
| 71 | 50 | 42 | 475 | 150 | 70 | 128.8 | very faint gray tint |
| 72 | 50 | 50 | 500 | 250 | 5 | 9.0 | very faint gray tint |
| 73 | 50 | 50 | 500 | 250 | 10 | 18.0 | very faint gray tint |
| 74 | 50 | 50 | 500 | 250 | 15 | 27.0 | light gray |
| 75 | 50 | 50 | 500 | 250 | 20 | 36.0 | light gray |
| 76 | 50 | 50 | 500 | 250 | 25 | 45.0 | light gray |
| 77 | 50 | 50 | 500 | 250 | 30 | 54.0 | light tan |
| 78 | 50 | 50 | 500 | 250 | 35 | 63.0 | light tan-very faint red tint |

TABLE 1-continued

| Preparative Example No. | Reaction Temperature (° C.) | SiCl₄ Flow Rate (mL/min) | H₂O Flow Rate (mL/min) | N₂ Flow Rate (mL/min) | Reaction Time (min) | Coating Thickness (nm) | Observed Retroreflective Color |
| --- | --- | --- | --- | --- | --- | --- | --- |
| 79 | 50 | 50 | 500 | 250 | 40 | 72.0 | light red |
| 80 | 50 | 50 | 500 | 250 | 55 | 110.0 | faint green-gray tint |
| 81 | 50 | 50 | 500 | 250 | 60 | 120.0 | faint green-gray tint |
| 82 | 50 | 42 | 475 | 150 | 25 | 43.3 | light gray |
| 83 | 50 | 42 | 475 | 150 | 29 | 50.2 | faint tan tint |
| 84 | 50 | 42 | 475 | 150 | 33 | 57.1 | light tan |
| 85 | 50 | 42 | 475 | 150 | 35 | 60.6 | light tan |
| 86 | 50 | 42 | 475 | 150 | 37 | 64.0 | light tan-very faint red tint |
| 87 | 50 | 42 | 475 | 150 | 39 | 67.5 | faint red tint |
| 88 | 50 | 42 | 475 | 150 | 41 | 70.9 | red-violet |
| 89 | 50 | 42 | 475 | 150 | 43 | 74.4 | violet-red |
| 90 | 50 | 42 | 475 | 150 | 45 | 77.9 | light violet |
| 91 | 50 | 42 | 475 | 150 | 47 | 81.3 | violet |
| 92 | 50 | 42 | 475 | 150 | 49 | 84.8 | violet-blue |
| 93 | 50 | 42 | 475 | 150 | 51 | 88.2 | light blue-violet |
| 94 | 50 | 50 | 500 | 250 | 10 | 19.1 | very faint gray tint |
| 95 | 50 | 50 | 500 | 250 | 15 | 28.7 | light gray |
| 96 | 50 | 50 | 500 | 250 | 20 | 38.2 | light gray |
| 97 | 50 | 50 | 500 | 250 | 25 | 47.8 | very faint tan tint |
| 98 | 50 | 50 | 500 | 250 | 30 | 57.3 | light tan |
| 99 | 50 | 50 | 500 | 250 | 35 | 66.9 | faint red tint |
| 100 | 50 | 50 | 500 | 250 | 36 | 68.8 | faint red tint |
| 101 | 50 | 50 | 500 | 250 | 37 | 70.7 | light red |
| 102 | 50 | 50 | 500 | 250 | 38 | 72.6 | red-violet |
| 103 | 50 | 50 | 500 | 250 | 39.5 | 75.4 | violet-red |
| 104 | 50 | 50 | 500 | 250 | 10 | 18.4 | very faint gray tint |
| 105 | 50 | 50 | 500 | 250 | 15 | 27.6 | very faint gray tint |
| 106 | 50 | 50 | 500 | 250 | 20 | 36.8 | light gray |
| 107 | 50 | 50 | 500 | 250 | 25 | 46.0 | light gray |
| 108 | 50 | 50 | 500 | 250 | 27 | 49.7 | very faint tan tint |
| 109 | 50 | 50 | 500 | 250 | 29 | 53.4 | faint tan tint |
| 110 | 50 | 50 | 500 | 250 | 30 | 55.2 | faint tan tint |
| 111 | 50 | 50 | 500 | 250 | 31 | 57.0 | light tan |
| 112 | 50 | 50 | 500 | 250 | 32 | 58.9 | light tan |
| 113 | 50 | 50 | 500 | 250 | 33 | 60.7 | light tan |
| 114 | 50 | 50 | 500 | 250 | 34 | 62.6 | light tan |
| 115 | 50 | 50 | 500 | 250 | 35 | 64.4 | light tan |
| 116 | 50 | 50 | 500 | 250 | 10 | 19.1 | very faint gray tint |
| 117 | 50 | 50 | 500 | 250 | 15 | 28.7 | light gray |
| 118 | 50 | 50 | 500 | 250 | 20 | 38.2 | light gray |
| 119 | 50 | 50 | 500 | 250 | 25 | 47.8 | very faint tan tint |
| 120 | 50 | 50 | 500 | 250 | 26 | 49.7 | very faint tan tint |
| 121 | 50 | 50 | 500 | 250 | 27 | 51.6 | very faint tan tint |
| 122 | 50 | 50 | 500 | 250 | 28 | 53.5 | faint tan tint |
| 123 | 50 | 50 | 500 | 250 | 29 | 55.4 | faint tan tint |
| 124 | rt | 25 | 800 | 800 | 5 | 12.7 | very faint gray tint |
| 125 | rt | 25 | 800 | 800 | 10 | 25.3 | very faint gray tint |
| 126 | rt | 25 | 800 | 800 | 15 | 38.0 | light gray |
| 127 | rt | 25 | 800 | 800 | 20 | 50.6 | very faint tan tint |
| 128 | rt | 25 | 800 | 800 | 25 | 63.3 | light tan-very faint red tint |
| 129 | rt | 25 | 800 | 800 | 28 | 70.8 | red-violet |
| 130 | rt | 25 | 800 | 800 | 30 | 75.9 | light violet-red |
| 131 | rt | 25 | 800 | 800 | 32 | 81.0 | violet |
| 132 | rt | 25 | 800 | 800 | 33 | 83.5 | violet-blue |
| 133 | rt | 25 | 800 | 800 | 35 | 88.6 | light blue-violet |
| 134 | rt | 25 | 800 | 800 | 5 | 12.6 | very faint gray tint |
| 135 | rt | 25 | 800 | 800 | 10 | 25.2 | very faint gray tint |
| 136 | rt | 25 | 800 | 800 | 15 | 37.8 | light gray |
| 137 | rt | 25 | 800 | 800 | 20 | 50.4 | very faint tan tint |
| 138 | rt | 25 | 800 | 800 | 25 | 63.0 | light tan-very faint red tint |
| 139 | rt | 25 | 800 | 800 | 26 | 65.5 | faint red tint |
| 140 | rt | 25 | 800 | 800 | 27 | 68.0 | faint red tint |

TABLE 1-continued

| Preparative Example No. | Reaction Temperature (° C.) | SiCl₄ Flow Rate (mL/min) | H₂O Flow Rate (mL/min) | N₂ Flow Rate (mL/min) | Reaction Time (min) | Coating Thickness (nm) | Observed Retroreflective Color |
|---|---|---|---|---|---|---|---|
| 141 | rt | 25 | 800 | 800 | 28 | 70.6 | light red |
| 142 | rt | 25 | 800 | 800 | 29 | 73.1 | red-violet |
| 143 | rt | 25 | 800 | 800 | 30 | 75.6 | violet-red |
| 144 | rt | 25 | 800 | 800 | 5 | 10.1 | very faint gray tint |
| 145 | rt | 25 | 800 | 800 | 10 | 20.2 | very faint gray tint |
| 146 | rt | 25 | 800 | 800 | 15 | 30.3 | light gray |
| 147 | rt | 25 | 800 | 800 | 20 | 40.4 | light gray |
| 148 | rt | 25 | 800 | 800 | 23 | 46.5 | light gray |
| 149 | rt | 25 | 800 | 800 | 25 | 50.5 | very faint tan tint |
| 150 | rt | 25 | 800 | 800 | 26 | 52.5 | faint tan tint |
| 151 | rt | 25 | 800 | 800 | 27 | 54.5 | faint tan tint |
| 152 | rt | 25 | 800 | 800 | 28 | 56.6 | light tan |
| 153 | rt | 25 | 800 | 800 | 29 | 58.6 | light tan |
| 154 | rt | 25 | 800 | 800 | 30 | 60.6 | light tan |
| 155 | rt | 25 | 800 | 800 | 31 | 62.6 | light tan |
| 156 | rt | 25 | 800 | 800 | 33 | 66.7 | light tan-very faint red tint |
| 157 | rt | 25 | 800 | 800 | 34 | 68.7 | faint red tint |
| 158 | rt | 25 | 800 | 800 | 35 | 70.7 | faint red tint |
| 159 | rt | 25 | 800 | 800 | 35.5 | 71.7 | light red |
| 160 | rt | 25 | 800 | 800 | 5 | 14.7 | very faint gray tint |
| 161 | rt | 25 | 800 | 800 | 10 | 29.3 | light gray |
| 162 | rt | 25 | 800 | 800 | 15 | 44.0 | light gray |
| 163 | rt | 25 | 800 | 800 | 18 | 52.7 | faint tan tint |
| 164 | rt | 25 | 800 | 800 | 20 | 58.6 | light tan |
| 165 | rt | 25 | 800 | 800 | 21 | 61.5 | light tan |
| 166 | rt | 25 | 800 | 800 | 22 | 64.5 | light tan |
| 167 | rt | 25 | 800 | 800 | 5 | 14.6 | very faint gray tint |
| 168 | rt | 25 | 800 | 800 | 10 | 29.1 | light gray |
| 169 | rt | 25 | 800 | 800 | 14 | 40.7 | light gray |
| 170 | rt | 25 | 800 | 800 | 15 | 43.7 | very faint tan tint |
| 171 | rt | 25 | 800 | 800 | 16 | 46.6 | very faint tan tint |
| 172 | rt | 25 | 800 | 800 | 17 | 49.5 | very faint tan tint |
| 173 | rt | 25 | 800 | 800 | 18 | 52.4 | faint tan tint |
| 174 | rt | 25 | 800 | 800 | 19 | 55.3 | faint tan tint |

TABLE 2

| Example No. | Reaction Temperature (° C.) | SiCl₄ Flow Rate (mL/min) | TEOS Flow Rate (mL/min) | H₂O Flow Rate (mL/min) | Reaction Time (min) | Coating Thickness (nm) | Observed Retroreflective Color |
|---|---|---|---|---|---|---|---|
| 175 | 50 | 50 | 250 | 500 | 10 | 21.1 | very faint gray tint |
| 176 | 50 | 50 | 250 | 500 | 15 | 31.7 | light gray |
| 177 | 50 | 50 | 250 | 500 | 20 | 42.2 | light gray |
| 178 | 50 | 50 | 250 | 500 | 25 | 52.8 | faint tan tint |
| 179 | 50 | 50 | 250 | 500 | 30 | 63.3 | light tan-faint red tint |
| 180 | 50 | 50 | 250 | 500 | 31 | 65.4 | faint red tint |
| 181 | 50 | 50 | 250 | 500 | 33 | 69.6 | faint red tint |
| 182 | 50 | 50 | 250 | 500 | 34 | 71.7 | light red |

TABLE 3

| Preparative Example No. | Coating time (min) | Observed Retroreflective Color |
|---|---|---|
| 183 | 20 | pale silver/blue |
| 184 | 40 | pale gold/gray |
| 185 | 60 | rust/violet |
| 186 | 67 | blue/violet |
| 187 | 74 | blue |
| 188 | 80 | blue-green |
| 189 | 88 | green |
| 190 | 94 | yellow-green |
| 191 | 133 | blue-green |

General Procedure for the Preparation of Type II Beads

Retrochromic beads having microcrystalline regions therein were prepared by combining in a porcelain milling jar with 1600 g of 1-cm zirconium oxide milling media (obtained under the trade designation "⅜ INCH (0.95 CM) RADIUS END ZIRCONIA CYLINDERS," item no. MED-ZOC.37, from Paul O. Abbe, Inc., Little Falls, N.J.); water; zirconium oxide (obtained under the trade designation "CF-PLUS-HM" from Z-TECH division of Carpenter Engineering Products, Bow, N.H.); aluminum oxide (obtained under the trade designation "16SG" from ALCOA Industrial Chemicals, Pittsburgh, Pa.); titanium oxide (obtained under the trade designation "KRONOS 1000" from KRONOS, Cranbury, N.J.); wollastonite (obtained under the trade designation "VANSIL W-30" from R.T. Vanderbilt, Norwalk, Conn.); talc (obtained under the trade designation "SUPRAFINO H" from Luzenac America, Englewood, Colo.); and either cobalt(II) nitrate hexahydrate (obtained under the trade designation "COBALT NITRATE CRYSTALS, Lot KMDJ" from Mallinckrodt, Paris, Ky.) and carboxymethylcellulose (Preparative Examples 192–193, obtained under the trade designation "CMC 7L2C" from Aqualon Division of Hercules Incorporated, Hopewell, Va.), or iron(III) nitrate nonahydrate (Preparative Examples 194–195, obtained under the trade designation "I110-500" from Fisher, Fairlawn, N.J.). After the respective mixtures were milled for 3 hours, each was dried to yield a powder cake, which was then ground with a mortar and pestle.

The ground powder was fed into the flame of a hydrogen/oxygen torch obtained from Bethlehem Apparatus Company, Hellertown, Pa., under the trade designation "BETHLEHEM BENCH BURNER PM2D MODEL B", hereinafter referred to as "Bethlehem Burner". The Bethlehem Burner delivered hydrogen and oxygen in the inner ring at 8.0 and 3.0 standard liters per minute, respectively, and in the outer ring at 23.0 and 9.8 standard liters per minute, respectively. The melted particles were entrained in the flame and projected into a water bath where they were rapidly cooled (i.e., quenched). The quenched beads were passed through the flame a second time and quenched again to improve their optical quality.

The quenched glass beads were devitrified by placing them in alumina crucibles and subjecting them to heat treatments in a furnace by ramping the temperature up from room temperature to the desired temperature at a rate of 10° C. per minute, maintaining the desired temperature for the desired "hold" time and then allowing the furnace to cool slowly to room temperature. The beads were removed from the crucibles after they were cooled to room temperature. The weights of reactants, the hold temperatures and hold times and the ambient-light and retroreflective colors of the beads of Preparative Examples 192–195 are reported in Table 4 (below). The resultant Type II intrinsically retrochromic are useful for preparing articles according to the present invention.

TABLE 4

| Component | Preparative Example 192 | Preparative Example 193 | Preparative Example 194 | Preparative Example 195 |
| --- | --- | --- | --- | --- |
| $H_2O$ | 160 g | 160 g | 350 g | 350 g |
| $ZrO_2$ | 29.12 g | 29.12 g | 29.12 g | 29.12 g |
| $Al_2O_3$ | 51.31 g | 51.31 g | 51.31 g | 51.31 g |
| $TiO_2$ | 62.37 g | 62.37 g | 62.37 g | 62.37 g |
| talc | 10.50 g | 10.50 g | 35.71 g | 35.71 g |
| wollastonite | 48.24 g | 48.24 g | 24.12 g | 24.12 g |
| $Co(NO_3)_2 \cdot 6H_2O$ | 7.25 g | 7.25 g | none | none |
| $Fe(NO_3)_3 \cdot 9H_2O$ | none | none | 5.06 g | 5.06 g |

TABLE 4-continued

| Component | Preparative Example 192 | Preparative Example 193 | Preparative Example 194 | Preparative Example 195 |
| --- | --- | --- | --- | --- |
| carboxymethyl-cellulose | 3.0 g | 3.0 g | none | none |
| hold temperature | 940° C. | 985° C. | 975° C. | 1000° C. |
| hold time | 30 min | 30 min | 30 min | 60 min |
| color in ambient light | gray-blue | gray-blue | off-white | off-white |
| retroreflective color | silver-blue | brown | yellow | orange-brown |

Example 1

This example describes the preparation of an article having a pattern.

A 3 cm×3 cm piece of pressure-sensitive adhesive tape having the trade designation "SCOTCH BRAND WHITE VINYL TAPE 471", obtained from 3M Company, was prepared. Beads according to Preparative Examples 192 and 193, substantially similar in ambient-lit appearance, were arranged in separate regions on the graphic and held in place by the PSA, i.e., the two different beads formed patterns in separate areas of the tape.

To create patterns, selected areas of a polyester (PET) film were cut out, creating windows for transfer of beads to the PSA. The polyester film, with selected open areas, was placed in contact with the bare PSA tape. Beads according to Preparative Example 193 were flood-coated over the masked PSA, leaving a monolayer of those beads attached to the PSA only in the open areas of the polyester mask. After the polyester mask was removed, revealing the remainder of the bare PSA areas, beads according to Example 192 were flood-coated over the substrate. The second flood coat left the substrate coated with beads according to Preparative Example 192, placed only in those areas of the graphic that were originally masked by the polyester film.

The ambient-lit appearance of the article was substantially uniform gray-blue color across both types of areas. However, observation in retroreflective mode revealed the following distinct color contrast between the two types of areas. Areas coated with Preparative Example 192 beads appeared silver-blue in the retroviewer, while areas coated with Preparative Example 193 beads appeared brown in the retroviewer.

Example 2

An article having a pattern was prepared as in Example 1 with the following differences:

Beads prepared according to Preparative Examples 192 and 193 were replaced by beads prepared according to Preparative Examples 194 and 195. The ambient-lit appearance of the article was a substantially uniform pale yellow/off-white color across both areas of beads. However, observation with a retroviewer revealed the following distinct color contrast between the two types of areas. Areas coated with Example 194 beads appeared brilliant yellow in the retroviewer, while areas coated with Example 195 beads appeared orange-brown in the retroviewer.

Example 3

This example describes the preparation of an article having a pattern.

A 5 cm×5 cm piece of the pressure-sensitive adhesive tape, used in Example 1, was prepared. Selected areas of the PSA tape were physically masked off with approximately 1 cm diameter plastic disks. Beads according to Preparative Example 185 were flood-coated over the masked PSA, leaving a monolayer of those beads attached to the PSA in areas not masked by the pieces of plastic. After the disks were removed, revealing the remaining bare PSA areas, beads according to Preparative Example 189 were flood-coated over the substrate. The second flood coat left the substrate coated with beads according to Preparative Example 189, placed only in those areas of the graphic that were originally masked. The ambient-lit appearance of the article was substantially uniform and uncolored across all bead covered areas. Areas coated with Preparative Example 185 beads appeared violet when viewed using a retroviewer, while areas coated with Preparative Example 189 beads appeared green using a retroviewer.

Example 4

A substrate having an array of wells was fabricated as follows. Curable silicone rubber obtained under the trade designation "SILASTIC J RTV SILICONE RUBBER" from Dow Corning, Midland, Mich.) was dispensed into an acrylonitrile/butadiene/styrene (ABS) mold. The mold was a vacuum formed ABS sheet with a square array of hemispherical protrusions. The square array had a period of 0.63 centimeters (cm). The hemispherical protrusions had diameters of 0.56 cm. The total array had 28×24 protrusions. The rubber was cured at room temperature (approximately 20° C.) against the ABS tooling, forming a 0.32 cm thick sheet of silicone rubber with a complementary array of hemispherical wells. Intrinsically retrochromic beads prepared according to Preparative Examples 41 and 53 were dispensed into individual wells as follows. Aliquots (0.02 g) of the beads were dispensed with a spatula into individual wells. Using a central 6×6-well portion of the array, the following pattern was created. Aliquots (0.02 g) of intrinsically retrochromic beads prepared according to Example 41 were dispensed with a spatula into the central 2×2 portion of the 6×6-well portion. Into the remaining 32 wells of the 6×6-well portion, 0.02 g aliquots of intrinsically retrochromic beads prepared according to Example 53 were dispensed with a spatula. Viewed under diffuse, ambient lighting, the article had the appearance of a green rubber sheet with a central square portion of its array of wells filled with clear beads—exhibiting essentially a white color. Under retroreflective viewing conditions, the article had the appearance of a green rubber sheet with a central square portion of its array filled with beads exhibiting retroreflective color as follows: a central region of the central square portion of the array of wells had a violet-red retroreflective color was enclosed within an adjacent border region that had a blue retroreflective color, forming a retrochromic pattern.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An article having a retrochromic pattern, the pattern comprising first and second viewable retroreflective regions having substantially different retroreflective colors if viewed using the same illumination source, wherein at least one of the viewable retroreflective regions comprises at least 10 intrinsically retrochromic beads and is retrochromic, and wherein the intrinsically retrochromic beads are selected from the group consisting of:
   i) intrinsically retrochromic beads having a spherical core, wherein the spherical core has a uniform and complete concentric optical interference layer thereon, and wherein the spherical core has a refractive index of at least 1.8, and
   ii) intrinsically retrochromic beads having microcrystalline regions therein, wherein the microcystalline regions have a size of from 50 to 250 nanometers, and
   iii) combinations thereof.

2. An article according to claim 1, wherein each of said intrinsically retrochromic beads has microcrystalline regions therein, and wherein the microcrystalline regions have a size of from 50 to 250 nanometers.

3. An article according to claim 1, wherein each of said intrinsically retrochromic beads comprises a spherical core having a uniform and complete concentric optical interference layer thereon, and wherein the spherical core has a refractive index of at least 1.8.

4. An article according to claim 3, wherein the index of refraction of the concentric optical interference layer on each said core is less than the index of refraction of the core.

5. An article according to claim 3, wherein the index of refraction of the concentric optical interference layer on each said core is greater than the index of refraction of the core.

6. An article according to claim 1, wherein said at least 10 beads comprises at least one intrinsically retrochromic bead having a first retroreflective color and at least one intrinsically retrochromic bead having a second retroreflective color, and wherein the first and second retroreflective colors are different.

7. An article according to claim 1, wherein the article comprises at least one intrinsically retrochromic bead comprising a spherical core having a uniform and complete concentric optical interference layer thereon, and at least one intrinsically retrochromic bead having microcrystalline regions therein, wherein the microcrystalline regions have a size of from 50 to 250 nanometers.

8. An article according to claim 1, wherein each of the first and second viewable retroreflective regions comprises a plurality of intrinsically retrochromic beads.

9. An article according to claim 1, wherein the first viewable retroreflective region comprises a first plurality of intrinsically retrochromic beads, is retrochromic, and has a first retroreflective color; wherein the second viewable retroreflective region comprises a second plurality of intrinsically retrochromic beads, is retrochromic, and has a second retroreflective color; further wherein the first and second retroreflective colors are different.

10. An article according to claim 1, wherein the retrochromic pattern comprises an identifying mark.

11. An article according to claim 10, wherein the identifying mark comprises a trademark or manufacturer's name.

12. An article according to claim 1, wherein the retrochromic pattern is covert.

13. An article according to claim 1, wherein the article comprises a substrate having a first major surface having a retroreflective layer affixed thereto, further wherein the retroreflective layer comprises a plurality of intrinsically retrochromic beads.

14. An article according to claim 13, wherein each bead of said plurality of intrinsically retrochromic beads has microcrystalline regions therein, and wherein the microcrystalline regions have a size of from 50 to 250 nanometers.

15. An article according to claim 13, wherein each bead of said plurality of intrinsically retrochromic beads comprises a spherical core having a concentric optical interference layer thereon, and wherein the spherical core has a refractive index of at least 1.8.

16. An article according to claim 13, wherein the article comprises at least one intrinsically retrochromic bead comprising a spherical core having a uniform and complete concentric optical interference layer thereon, and at least one intrinsically retrochromic bead having microcrystalline regions therein, wherein the microcrystalline regions have a size of from 50 to 250 nanometers.

17. An article according to claim 13, wherein the first and second viewable retroreflective regions each comprise a plurality of intrinsically retrochromic beads.

18. An article according to claim 13, wherein the first viewable retroreflective region comprises a first plurality of intrinsically retrochromic beads, is retrochromic, and has a first retroreflective color; wherein the second viewable retroreflective region comprises a second plurality of intrinsically retrochromic beads, is retrochromic, and has a second retroreflective color; further wherein the first and second retroreflective colors are different.

19. An article according to claim 13, wherein the pattern comprises an identifying mark.

20. An article according to claim 19, wherein the identifying mark comprises a trademark or manufacturer's name.

21. An article according to claim 13, wherein the retrochromic pattern is covert.

22. An article according to claim 13, wherein at least a portion of the substrate is transparent.

23. An article according to claim 13, wherein the substrate is transparent in its entirety.

24. An article according to claim 13, wherein the substrate comprises at least one of thermoplastic film, metal foil, or paper.

25. An article according to claim 13, wherein the substrate further comprises a second major surface opposed to the first major surface.

26. An article according to claim 25, wherein an adhesive layer is affixed to the second major surface.

27. An article according to claim 26, wherein the adhesive layer further contacts a release liner.

28. An article according to claim 26, wherein adhesive comprises pressure-sensitive adhesive.

29. An article according to claim 26, wherein the adhesive layer further is affixed to a security article.

30. An article according to claim 29, wherein the substrate comprises polyurethane film.

31. An article according to claim 29, wherein the security article comprises at least one of a certificate, a financial instrument, a ticket, an identity card, a passport, or a license.

32. An article according to claim 13, wherein at least one viewable region comprises a layer having a substantially uniform thickness.

33. An article according to claim 13, wherein the retroreflective layer further comprises binder.

34. An article according to claim 33, wherein a plurality of intrinsically retrochromic beads are partially embedded within binder.

35. An article according to claim 1, wherein the article comprises a substrate having a first major surface having at least one topographical feature.

36. An article according to claim 35, wherein each of said intrinsically retrochromic beads has microcrystalline regions therein, and wherein the microcrystalline regions have a size of from 50 to 250 nanometers.

37. An article according to claim 35, wherein each of said intrinsically retrochromic beads comprise a spherical core having a uniform and complete concentric optical interference layer thereon, and wherein the spherical core has a refractive index of at least 1.8.

38. An article according to claim 37, wherein the index of refraction of the concentric optical interference layer on each said core is less than the index of refraction of the core.

39. An article according to claim 35, wherein the article comprises intrinsically retrochromic beads having a spherical core having a uniform and complete concentric optical interference layer thereon, and intrinsically retrochromic beads having microcrystalline regions therein, and wherein the microcrystalline regions have a size of from 50 to 250 nanometers.

40. An article according to claim 35, wherein the first and second viewable retroreflective regions each comprise a plurality of intrinsically retrochromic beads.

41. An article according to claim 35, wherein the first viewable retroreflective region comprises a first plurality of intrinsically retrochromic beads, is retrochromic, and has a first retroreflective color; wherein the second viewable retroreflective region comprises a second plurality of intrinsically retrochromic beads, is retrochromic, and has a second retroreflective color; further wherein the first and second retroreflective colors are different.

42. An article according to claim 35, wherein the pattern comprises an identifying mark.

43. An article according to claim 42, wherein the identifying mark comprises a trademark or manufacturers name.

44. An article according to claim 35, wherein the retrochromic pattern is covert.

45. An article according to claim 35, wherein at least a portion of the substrate is transparent.

46. An article according to claim 35, wherein the substrate is transparent in its entirety.

47. An article according to claim 35, wherein the substrate comprises at least one of thermoplastic film, metal foil, or paper.

48. An article according to claim 35, wherein the substrate further comprises a second major surface opposed to the first major surface.

49. An article according to claim 48, wherein an adhesive layer is affixed to the second major surface.

50. An article according to claim 49, wherein the adhesive layer further contacts a release liner.

51. An article according to claim 49, wherein adhesive comprises pressure-sensitive adhesive.

52. An article according to claim 49, wherein the adhesive layer further is affixed to a security article.

53. An article according to claim 52, wherein the substrate comprises polyurethane film.

54. An article according to claim 52, wherein the security article comprises at least one of a certificate, a financial instrument, a ticket, an identity card, a passport, or a license.

55. An article according to claim 35, wherein the topographical feature is selected from a channel, a groove, or a well.

56. An article according to claim 35, wherein the first major surface comprises a plurality of wells.

57. An article according to claim 56, wherein at least one intrinsically retrochromic bead is contained within at least one well.

58. An article according to claim 56, wherein a transparent cover is affixed to the first major surface to form at least one enclosed cavity containing at least one intrinsically retrochromic bead.

59. An article according to claim 58, wherein the intrinsically retrochromic bead comprises a spherical core having a uniform and complete concentric optical interference layer thereon, wherein the index of refraction of the optical interference layer is less than the index of refraction of the core.

60. The retrochromic article of claim 58, wherein at least one enclosed cavity contains a liquid.

61. An article according to claim 1, wherein the article comprises a substrate having at least one viewable interior region containing at least one intrinsically retrochromic bead.

62. An article according to claim 61, wherein each of said intrinsically retrochromic beads has microcrystalline regions therein, and wherein the microcrystalline regions have a size of from 50 to 250 nanometers.

63. An article according to claim 61, wherein each of said intrinsically retrochromic bead comprises a spherical core having a uniform and complete concentric optical interference layer thereon, and wherein the spherical core has a refractive index of at least 1.8.

64. An article according to claim 63, wherein the index of refraction of the concentric optical interference layer on each said core is less than the index of refraction of the core.

65. An article according to claim 61, wherein the first and second viewable retroreflective regions each comprise a plurality of intrinsically retrochromic beads.

66. An article according to claim 61, wherein the first viewable retroreflective region comprises a first plurality of intrinsically retrochromic beads, is retrochromic, and has a first retroreflective color; wherein the second viewable retroreflective region comprises a second plurality of intrinsically retrochromic beads, is retrochromic, and has a second retroreflective color; further wherein the first and second retroreflective colors are different.

67. An article according to claim 61, wherein the pattern comprises an identifying mark.

68. An article according to claim 67, wherein the identifying mark comprises a trademark or manufacturer's name.

69. An article according to claim 61, wherein the retrochromic pattern is covert.

70. A method of making an article having a retrochromic pattern comprising:
   providing a substrate;
   affixing a first retroreflective material to the substrate to form a first viewable retroreflective region; and
   affixing a second retroreflective material to the substrate to form a second viewable retroreflective region;
wherein the first and second retroreflective materials form a retrochromic pattern, the pattern comprising first and second viewable retroreflective regions having substantially different retroreflective colors if viewed using the same illumination source, wherein at least one of the viewable retroreflective regions comprises at least 10 intrinsically retrochromic beads and is retrochromic, and wherein the intrinsically retrochromic beads are selected from the group consisting of:
   i) intrinsically retrochromic beads having a spherical core, wherein the spherical core has a uniform and complete concentric optical interference layer thereon, and wherein the spherical core has a refractive index of at least 1.8, and
   ii) intrinsically retrochromic beads having microcrystalline regions therein, wherein the microcystalline regions have a size of from 50 to 250 nanometers, and
   iii) combinations thereof.

71. An article according to claim 70, wherein each of said intrinsically retrochromic beads has microcrystalline regions therein, and wherein the microcrystalline regions have a size from 50 to 250 nanometers.

72. A method according to claim 71, wherein each of said intrinsically retrochromic beads comprises a spherical core having a uniform and complete concentric optical interference layer thereon, and wherein the spherical core has a refractive index of at least 1.8.

73. A method according to claim 72, wherein the index of refraction of the concentric optical interference layer on each said core is less than the index of refraction of the core.

74. A method according to claim 72, wherein the index of refraction of the concentric optical interference layer on each said core is greater than the index of refraction of the core.

75. A method according to claim 70, wherein said at least 10 beads comprises at least one intrinsically retrochromic bead having a first retroreflective color and at least one intrinsically retrochromic bead having a second retroreflective color, and wherein the first and second retroreflective colors are different.

76. A method according to claim 70, wherein at least one of the first and second retroreflective materials comprises binder.

77. A method according to claim 70, wherein the substrate contains at least one interior region, wherein the interior region contains at least one of the first and second retroreflective materials.

78. A method according to claim 70, wherein the substrate comprises a surface, further wherein the surface comprises at least one topographical feature.

79. A method according to claim 70, wherein affixing means partially embedding, printing, adhesively bonding, or a combination thereof.

80. A method according to claim 70, wherein affixing means printing.

81. A method according to claim 70, wherein affixing means adhesively bonding.

82. A method according to claim 70, wherein the first viewable retroreflective region comprises a first plurality of intrinsically retrochromic beads, is retrochromic, and has a first retroreflective color; wherein the second viewable retroreflective region comprises a second plurality of intrinsically retrochromic beads, is retrochromic, and has a second retroreflective color; further wherein the first and second retroreflective colors are different.

83. A method according to claim 82, wherein the substrate has first and second opposed major surfaces.

84. A method according to claim 83, further comprising heat laminating the substrate to a security article.

85. A method according to claim 84, wherein the security article comprises at least one of a certificate of tide, a stock certificate, a financial instrument, a ticket, a check, a financial card, an identity card, currency, a passport, a tamper-indicating seal, or a license.

86. A method according to claim 85, wherein at least a portion of the substrate is transparent.

87. A method according to claim 83, wherein the first major surface has at least one topographical feature.

88. A method according to claim 87, further comprising the step of affixing a cover layer to the first major surface to form at least one cavity, wherein the at least one cavity contains at least one of the first and second retroreflective materials.

89. A method according to claim 87, wherein at least one topographical feature is selected from at least one of a channel, a groove, or a well, or is a combination thereof.

90. A method according to claim 87, wherein the first major surface comprises a plurality of wells.

91. A method according to claim 83, wherein the substrate is transparent.

92. A method according to claim 83, wherein each of said intrinsically retrochromic beads has microcrystalline regions therein, and wherein the microcrystalline regions have a size of from 50 to 250 nanometers.

93. A method according to claim 83, wherein each of said intrinsically retrochromic beads comprises a spherical core having a uniform and complete concentric optical interference layer thereon, and wherein the spherical core has a refractive index of at least 1.8.

94. A method according to claim 93, wherein the index of refraction of the concentric optical interference layer on each said core is less than the index of refraction of the core.

95. A method according to claim 93, wherein the index of refraction of the concentric optical interference layer on each said core is greater than the index of refraction of the core.

96. A method according to claim 83, further comprising affixing adhesive to the second major surface of the substrate.

97. A method according to claim 96, further comprising affixing the adhesive layer to a security article.

98. A method according to claim 97, wherein the security article comprises at least one of a certificate of title, a stock certificate, a financial instrument, a ticket, a check, a financial card, an identity card, currency, a passport, a tamper-indicating seal, or a license.

99. A method according to claim 98, wherein at least a portion of the substrate is transparent.

100. An article having a retrochromic pattern, the pattern comprising first and second viewable retroreflective regions having substantially different retroreflective colors if viewed using the same illumination source, wherein at least one of the viewable retroreflective regions comprises intrinsically retrochromic beads which are non-randomly positioned with respect to adjacent beads, and wherein the intrinsically retrochromic beads are selected from the group consisting of:
  i) intrinsically retrochromic beads having a spherical core, wherein the spherical core has a uniform and complete concentric optical interference layer thereon, and wherein the spherical core has a refractive index of at least 1.8, and
  ii) intrinsically retrochromic beads having microcrystalline regions therein, wherein the microcrystalline regions have a size of from 50 to 250 nanometers, and
  iii) combinations thereof.

101. An article according to claim 100, wherein the article comprises a substrate having a first major surface having a retroreflective layer affixed thereto, further wherein the retroreflective layer comprises a plurality of intrinsically retrochromic beads.

102. An article according to claim 100, wherein the article comprises a substrate having a first major surface having at least one topographical feature.

103. An article according to claim 100, wherein the article comprises a substrate having at least one viewable interior region containing at least one intrinsically retrochromic bead.

* * * * *

UNITED STATES PATENT AND TRADEMARK OFFICE
CERTIFICATE OF CORRECTION

| | | |
|---|---|---|
| PATENT NO. | : 7,036,944 B2 | Page 1 of 2 |
| APPLICATION NO. | : 10/122520 | |
| DATED | : May 2, 2006 | |
| INVENTOR(S) | : Kenton D. Budd | |

It is certified that error appears in the above-identified patent and that said Letters Patent is hereby corrected as shown below:

Title Page
Item [75], Inventors, insert -- John E. Bailey, Shorewood, WI (US) -- following "Matthew H. Frey, Cottage Grove, MN (US)".

Column 13
Line 50, Below "Minn." delete "Type II Intrinsically Retrochromic Beads" and insert the same above "intrinsically ret-" as a heading.

Column 17
Line 12, delete "ti" following "which".

Column 28
Line 13, Claim 1, delete "microcystalline" and insert -- microcrystalline -- in place thereof.

Column 30
Line 34, Claim 43, delete "manufacturers" and insert -- manufacturer's -- in place thereof.

Column 31
Lines 58-59, Claim 70, delete "retroreflecive" and insert -- retroreflective -- in place thereof.

UNITED STATES PATENT AND TRADEMARK OFFICE
CERTIFICATE OF CORRECTION

PATENT NO. : 7,036,944 B2
APPLICATION NO. : 10/122520
DATED : May 2, 2006
INVENTOR(S) : Kenton D. Budd It is certified that error appears in the above-identified patent and that said Letters Patent is hereby corrected as shown below:

<u>Column 32</u>
Line 2, Claim 70, delete "microcystalline" and insert -- microcrystalline -- in place thereof.
Line 7, Claim 71, insert -- of -- following "size".
Line 58, Claim 85, delete "tide" and insert -- title -- in place thereof.

Signed and Sealed this

Fifth Day of August, 2008

JON W. DUDAS
*Director of the United States Patent and Trademark Office*